(12) United States Patent
Kim et al.

(10) Patent No.: US 8,346,788 B1
(45) Date of Patent: Jan. 1, 2013

(54) TECHNIQUES FOR MAPPING DATA MODELS USING AN INTERMEDIATE PROCESSING LAYER

(75) Inventors: Ken Kim, Worcester, MA (US); Jingyan Zhao, Harvard, MA (US); Yong Wang, Westborough, MA (US); Lorenzo Bailey, Framingham, MA (US); Utkarsh Vipul, Mansfield, MA (US); Muhamad Djunaedi, Northborough, MA (US); Xuan Tang, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/065,735

(22) Filed: Mar. 29, 2011

(51) Int. Cl.
*G06F 7/00* (2006.01)
*G06F 9/44* (2006.01)

(52) U.S. Cl. ........................ 707/756; 717/104
(58) Field of Classification Search ................. 707/755, 707/756, 999.102, 803, 804, 809; 717/104
See application file for complete search history.

(56) References Cited

U.S. PATENT DOCUMENTS

| 6,591,272 | B1 * | 7/2003 | Williams .............................. 1/1 |
| 6,658,429 | B2 * | 12/2003 | Dorsett, Jr. .................... 707/708 |
| 7,085,773 | B2 * | 8/2006 | Dorsett, Jr. .................... 707/755 |
| 7,797,409 | B1 * | 9/2010 | Secer .............................. 709/223 |
| 2004/0088117 | A1 * | 5/2004 | Dorsett, Jr. ...................... 702/22 |
| 2005/0071805 | A1 * | 3/2005 | Lauterbach et al. .......... 717/104 |
| 2009/0024652 | A1 * | 1/2009 | Thompson et al. ........... 707/102 |

OTHER PUBLICATIONS

Ken Kim, et al., "Techniques for Performing View Indication Management", U.S. Appl. No. 13/065,738, filed Mar. 29, 2011.

* cited by examiner

*Primary Examiner* — Hung T Vy
(74) *Attorney, Agent, or Firm* — Muirhead and Saturnelli, LLC

(57) ABSTRACT

Described are techniques for mapping a first set of objects in a first data model to a second set of objects in a second data model. In response to receiving the first set of objects, a third set of objects are generated using the first set of objects. The third set of objects include association objects each of which represent an association between a first object in the second set and a second object in the second set. A command set of provided for generating the second set of objects by extracting information from objects included in any of the first set and the third set. A request for an object in the second set is received. In response to the request, commands of the command set are executed to generate the object.

21 Claims, 15 Drawing Sheets

TECHNIQUES FOR MAPPING DATA MODELS USING AN INTERMEDIATE PROCESSING LAYER

BACKGROUND

1. Technical Field

This application relates to techniques used in connection with processing data in different data models.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, multiple computer processing nodes may provide information regarding one or more components of the system. Information from the multiple nodes may be presented in a collective view to provide for a consolidated logical view of the system in terms of the components, state of the components, and the like. Such a consolidated view may be used, for example, in connection with performing system management. When providing such a consolidate view, the collected data may be in accordance with a first data model and the data presented to the user in the consolidated view may be organized in accordance with a second data model different from the first data model. In this case, the collected data in the first data model may be translated or mapped into other data in accordance with the second data model.

SUMMARY OF THE INVENTION

In accordance with one aspect of the invention is a method for mapping a first set of objects in a first data model to a second set of objects in a second data model. A first set of objects is received. In response to receiving the first set of objects, a third set of objects is generated using the first set of objects, the third set of objects including a plurality of association objects, each of the plurality of association objects representing an association between a first object in the second set and a second object in the second set. A command set of one or more commands is provided for generating the second set of objects. The one or more commands extract information from one or more objects included in any of the first set and the third set. A request is received for one of the objects in the second set. In response to receiving the request, one or more commands from the command set are executed to generate said one object. The method may also include receiving an updated set of objects in the first data model, said updated set being an updated version of the first set of objects; determining differences between the updated set of objects and the first set of objects; and updating the third set of objects in response to the differences determined. A selected one or more commands in the command set for generating a selected one or more objects in the second set may be executed only in response to a received request for the selected one or more objects. The updated set may be received in response to a polling interval occurrence. The third set of objects may include an object having a first property determined in accordance with a plurality of values of one or more properties from one or objects in the first set. The first property may be based on a mathematical calculation using the plurality of values. The first set of objects may include objects describing paths for sending data from an initiator to a target. The third set of objects may include a first association object representing a preferred path associated with a first initiator. The preferred path may be selected from one of a plurality of paths to a same host, wherein first processing may be performed to determine said preferred path as part of processing performed in response to receiving the first set of objects. The request may be for selected ones of the second objects presented using a user interface. The first set of objects and the third set of objects may be stored in database tables and the command set may include one or more queries for generating each of the objects in the second set using any of the database tables. The third set of objects may include at least one object in the second data model generated in response to receiving the first set of objects, said at least one object being stored in one of the database tables.

In accordance with another aspect of the invention is a system comprising a host set of one or more hosts, each of the hosts including one or more initiator ports; a data storage system including one or more target ports, a storage group of one or more storage devices being accessible through said one or more target parts from said one or more initiator ports, a plurality of paths being formed between the host and the data storage system, each of the plurality of paths being defined from one of the initiator ports to one of the target ports; a computer readable medium comprising code stored thereon for mapping a first set of objects in a first data model to a second set of objects in a second data model, the computer readable medium comprising code for receiving the first set of objects including objects describing the plurality of paths; in response to receiving the first set of objects, building a third set of objects using the first set of objects, the third set of objects including a plurality of association objects, each of the plurality of association objects representing an association between a first object in the second set and a second object in the second set; providing a command set of one or more commands for generating the second set of objects, wherein said one or more commands extract information from one or more objects included in any of the first set and the third set; receiving a request for one of the objects in the second set; and in response to receiving the request, executing one or more commands from the command set to generate said one object. The plurality of association objects may include an association object representing an association between one of the hosts and the storage group. The plurality of association objects may include an association object representing an association between one of the hosts and one of the initiator ports. The plurality of association objects may include an association object representing an association between one of the plurality of paths and one of the initiator ports. The plurality of association objects my include an association object representing an association between one of the plurality of paths and one of the target ports.

In accordance with another aspect of the invention is a computer readable medium comprising code stored thereon for mapping a first set of objects in a first data model to a second set of objects in a second data model. The computer readable medium includes code stored thereon. The first set of objects is received. In response to receiving the first set of objects at least a portion of a third set of objects using the first set of objects is updated The third set of objects includes a plurality of association objects. Each of the association objects represents an association between a first object in the second set and a second object in the second set. The updating includes determining differences between the first set of objects and a data set including a previous version of the first set of objects. The updating include selectively performing operations to update, delete and create objects of the third set based on dependencies of the third set upon the differences. A command set of one or more commands is provided for generating the second set of objects. The one or more commands extract information from one or more objects included in any of the first set and the third set. A request for one of the objects in the second set is received. In response to receiving the request, one or more commands from the command set are executed to generate said one object. A selected one or more commands in the command set for generating a selected one or more objects in the second set may be executed only in response to a received request for the selected one or more objects. The first set of objects and the third set of objects may be stored in database tables. The second set of objects may be included in a virtual table of a view generated by executing said one or more commands which operate on data included in any of said first set of objects and said third set of objects. At least one of the commands may be a database query which joins rows from a plurality of database tables including objects of the third set generating a query result including data used to create the virtual table. The first set of objects may be based on data collected upon the occurrence of a polling interval, the first set of objects including data storage configuration information describing a state of a data storage system. Each of the association objects may be represented using two primary keys of a database table to associate a pair of objects of the second set.

In some embodiments of the invention, three software layers may be utilized. Data may be acquired by a first of the three layers and differences may be determined between a currently acquired data set and a previously acquired data set. The currently acquired data set may be a later version of objects of the previously acquired data set. Differences between the currently acquired and previously acquired data sets may be determined. Based on the differences, one or more objects used by a second or intermediate one of the three layers may be selectively updated based on dependencies between the one or more objects and the differences. At a later point in time, a request may be received for one or more objects of a third of the software layer. In response to the request, the one or more objects may be selectively generating using at least one command which operates on data of one or more objects used by any of the first layer and the second layer. The one or more objects of the third software layer may be generated as a virtual table or view by executing one or more database queries which may extract data from one or more database tables including objects generated by any of the first layer and the second layer. The one or more objects generated by the second layer may include an association object represented using two primary database table keys. A first of the primary keys may identify an object of the virtual table or view associated with another objects of the virtual table or view.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
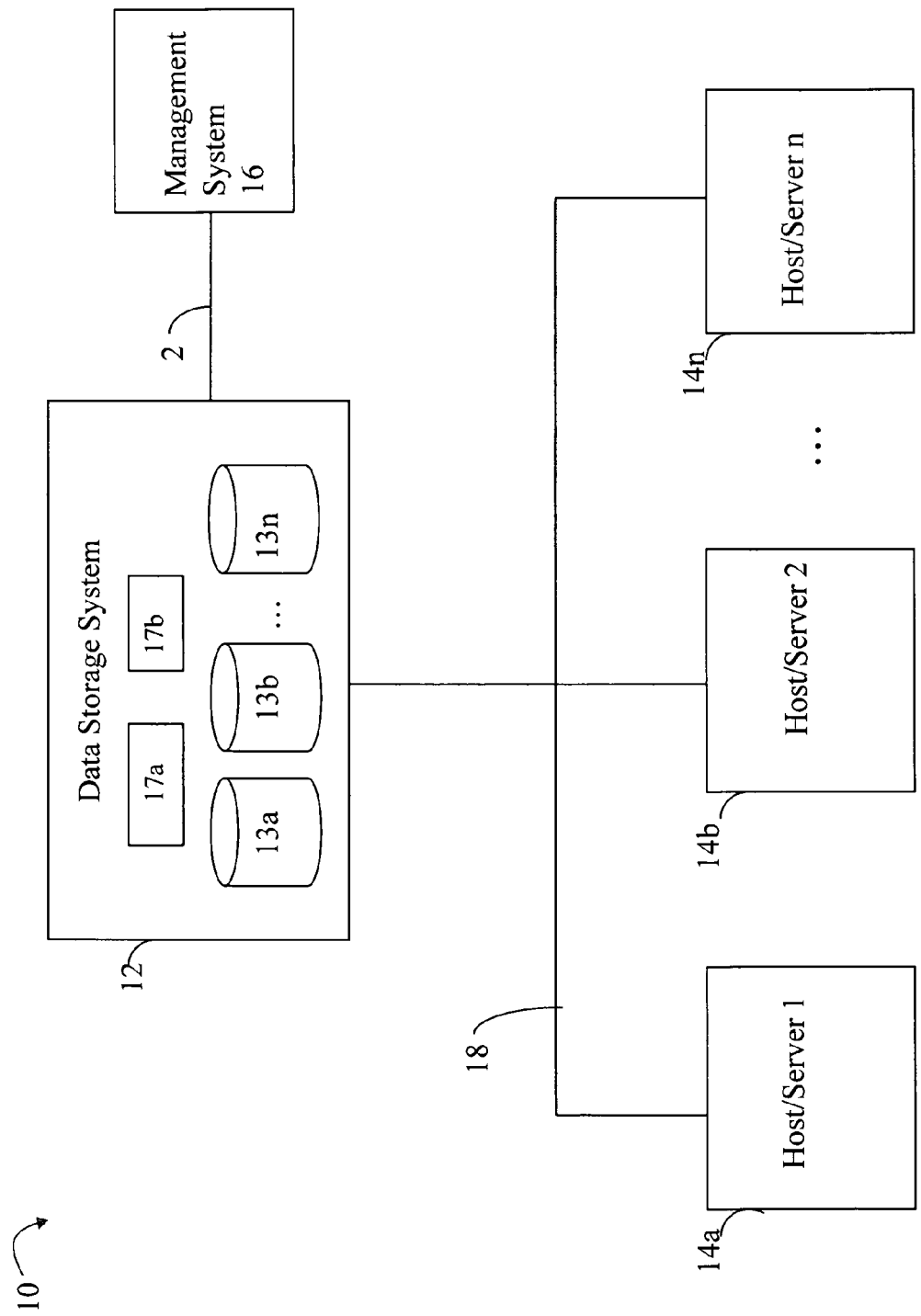
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein will be described with respect to a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a CLARiiON® data storage array by EMC Corporation of Hopkinton, Mass., including a plurality of data storage devices 16a-16n and two service processors 17a, 17b. The service processors 17a, 17b may be computer processing units included in the data storage system for processing requests and commands. In connection with performing techniques herein, an embodiment of the data storage system may include multiple service processors including more than two service processors as described. The CLARiiON® data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desk top computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
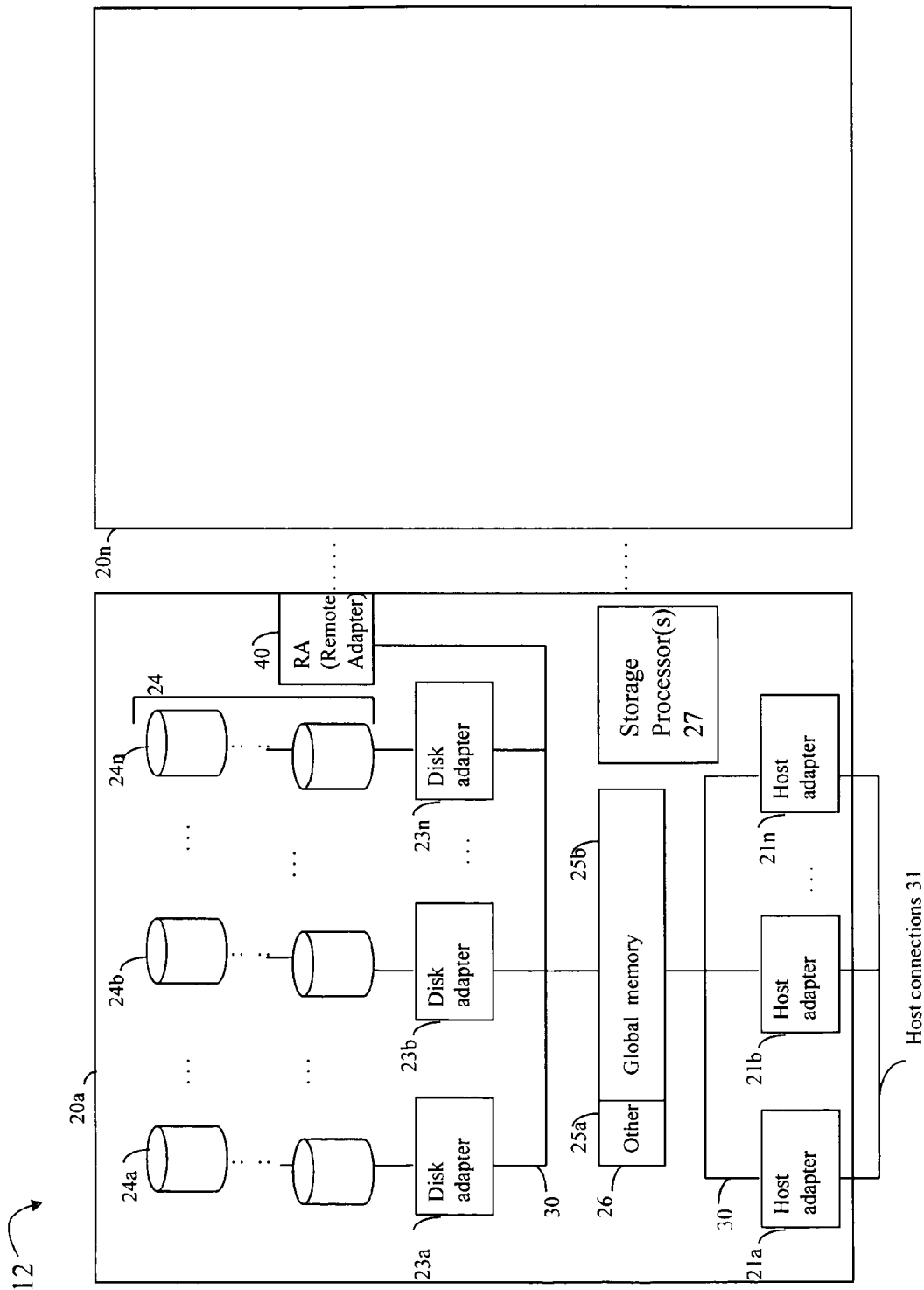
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

Figure 2A:
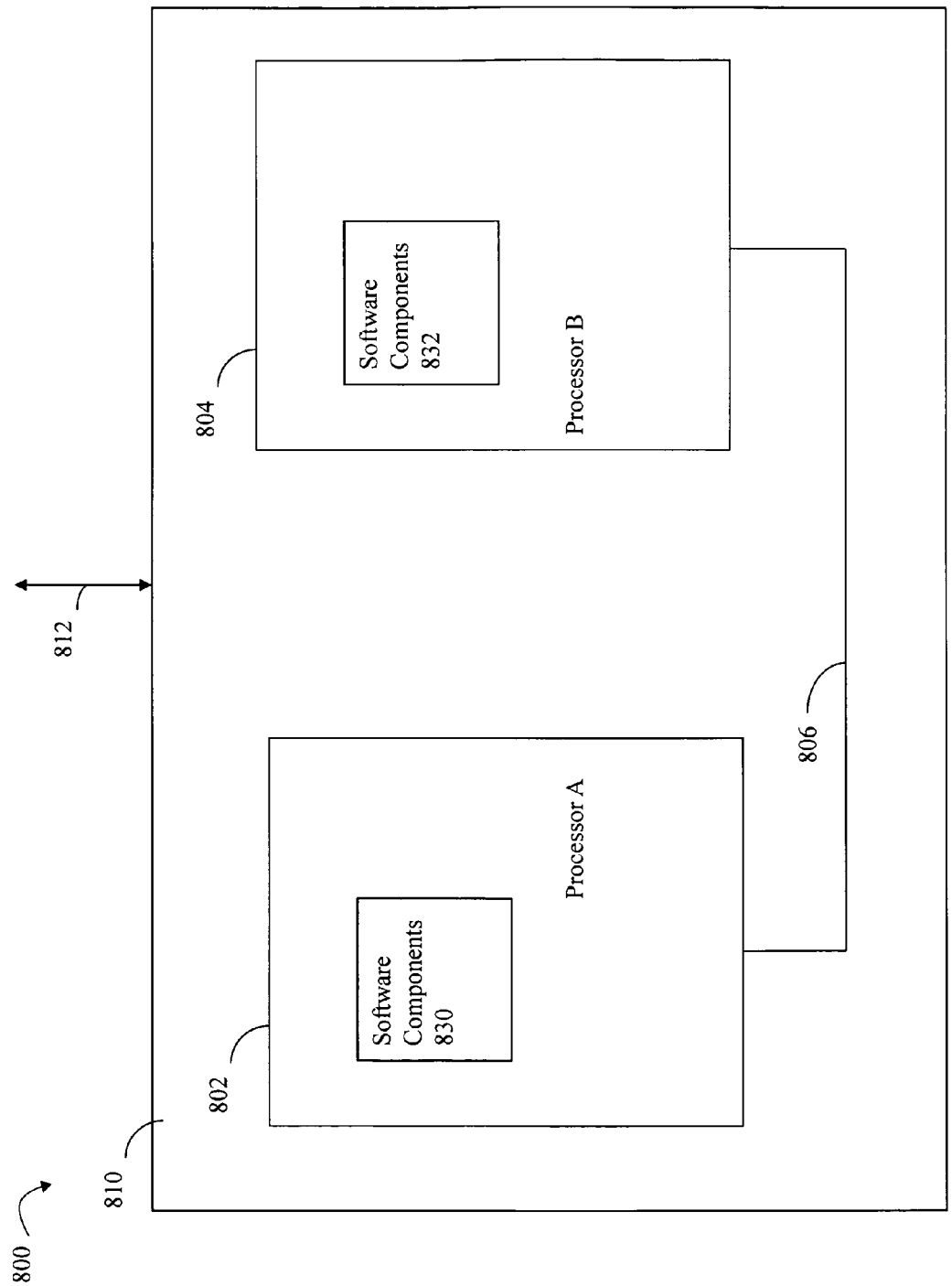
FIG. 2A is an example illustrating a data storage system including multiple service processors in an embodiment in accordance with techniques herein.

Referring to FIG. 2A, shown is a block diagram of components that may be included in a data storage system 810. In the example 800, there are two service processors 802, 804 (also referred to as service processors A and B) although a data storage system and techniques herein may be used in an embodiment in which the data storage system includes more than two service processors as mentioned above. Service processor 802 includes software components or modules 830 executing thereon. Service processor 804 includes software components or modules 832 executing thereon. Service processor 802 and 804 may communicate using 806 which is described in more detail below. Element 812 may represent a single logical communication connection used for data storage system management transmissions between the data storage system 810 and one or more external clients. The software components or modules 830 and 832 may be software modules included in data storage system management software residing and executing on the data storage system 810 including software used in connection with communicating with external clients over network connection 812.

The two service processors 802, 804 may control the operation of the data storage system. The processors may be configured to process requests as may be received from the hosts, other data storage systems, management system, and other components connected thereto. Each of the processors 802, 804 may process received requests and operate independently and concurrently with respect to the other processor. In the example 800, each processor is illustrated as having one or more software modules (e.g., web server, drivers, other modules etc.) executing thereon. An embodiment may have a same set of one or more software modules executing on each processor so that either of the processors may service a received request. The example 800 may illustrate the state of the data storage system with software modules that are loaded as a result of booting the data storage system. In the example 800, the processors 802 and 804 have successfully completed the boot process leaving both 802 and 804 in what may be characterized as a healthy state with respect to data storage system management functionality. A service processor may be characterized as being in the healthy state if the service processor has the ability to service normal data storage system management messaging traffic over a communication connection, such as a network connection, used for data storage management. In other words, a processor may be characterized as healthy if it is determined that the processor is able to perform necessary processing and communications in connection with handling typical data storage system management transmissions over a connection used for normal data storage management messaging traffic. A processor may otherwise be characterized as being in an unhealthy state if any deficiency is determined with respect to the foregoing, such as a hardware and/or software problem, so that the processor is unable to be used in connection with handling data storage system management transmissions. Once booted, a processor may transition between the states of healthy and unhealthy in accordance with problems that may occur and/or be corrected over time.

With respect to data storage management requests, operations, and the like, as may be received from a client, such as the management system 16 of FIG. 1 in connection with the techniques herein, the client may interact with a designated one of the two processors 802, 804 over the communication connection 812. The designated one of the processors may be characterized as the master with the other processor designated as the slave. In connection with one embodiment in accordance with techniques herein, the data storage system may operate in accordance with a master-slave or active-passive model when communicating with the management system 16. In accordance with the master-slave model, only one of the processors 802, 804 and only one instance of the software modules executing thereon, may be designated as a "master" with the other processor and associated software modules thereon designated as the "slave". It should be noted that as used herein, the terms "active" and "master" may be used interchangeably to refer to the designated active or master processor in the master-slave or active-passive model. Similarly, the terms "slave" or "passive" may be used interchangeably to refer to the one or more processors other than the active or master processor in accordance with the master-slave or active-passive model.

In the example 800, instances of the software components 830, 832 executing, respectively, on processors 802, 804 may communicate over connection 806. The connection 806 may be a bus or other communication connection to facilitate inter-processor communication between the drivers. The connection 806 may be characterized as internal to the data storage system or local with respect to residing on the data storage system and used for communicating between components on the data storage system. The connection 806 may also be referred to as the common management interconnection (CMI) and may be characterized as part of an internal network over which inter-processor communications may occur. Thus, one of the service processors may use connection 806 to communication with the other service processor. As will be described in more detail in following paragraphs, each service processor may include code which facilitates communication with the other service processor using the connection 806 for inter-service processor communication. In particular, code of a first service processor may use connection 806 to obtain information collected from another service processor for use in connection with the first service processor providing a consolidated view of the data storage system such as when providing such information in response to a data storage system management request from the management system 16.

The processors 802, 804 may also communicate over another connection 812. The connection 812 may represent a TCP/IP or other network connection over which instances of the software components 830, 832 on processors 802, 804 (respectively) may communicate with other externally networked components. Connection 812 may correspond to a single logical connection used, for example, to communicate with a client such as the management system 16 running a web browser displaying a GUI (graphical user interface). The connection 812 may be characterized as a single communication connection between the data storage system and the management system over which the user on the management system 16 may interact with the data storage system in performing data storage system management tasks. The processors 802, 804 may send and/or receive transmissions over connection 812 from the management system 16 of FIG. 1. In one embodiment, the connection 812 may be part of a dedicated LAN connection for management operations. Host I/O requests may be received at the data storage system on different incoming ports such as, for example, Fibre channel or iSCSI ports not illustrated.

Only one of the processors 802, 804 is designated as active or the master at any time. Thus, at any point in time, at most one of the SPs 802, 804 communicates with a client in connection with handling data storage system management transmissions over the single connection 812. In the event that an active master processor transitions from a healthy to an unhealthy state, the passive slave processor assumes the role of master if it is in a healthy state. In connection with techniques herein, when failover processing results in a processor assuming the role of master, the software components thereon may also be designated as the instance of the software modules which are active and communicate with the client. As described herein, a processor may be characterized as having an unhealthy state if the processor and/or software components executing thereon are not able to communicate with and/or process requests from an external client, such as the management system 16, over a network. Detection of the state of a processor and/or software components executing thereon as healthy or unhealthy may be performed using a variety of different techniques such as, for example, by the processor itself and/or its peer processor. Such techniques may include, for example, periodically having each processor test communications with the other processor over connections 806, determining a status regarding the software modules on a service processor and its ability to communicate over the external communication connection used for data storage system management transmissions, receiving a notification regarding status of a peer processor, and the like.

The connection 812 may have a single network address, such as an IP address, over which the active processor and code executing thereon may communicate with the management system 16 in connection with performing the techniques herein. The software components 830, 832 may represent software components or modules as described herein in more detail on each of the processors. It should be noted that the data storage system 810 of the example 800 includes other components, such as storage devices, which are omitted from the example 800 for simplicity in illustrating the dual processors 802, 804.

In connection with techniques herein, the management system 16 may issue a request to the data storage system such as illustrated in FIG. 2A. The request may be to provide a logical system configuration view regarding components of the data storage system, the state of such components, and the like. In connection with providing such a view, information may be gathered from each of the service processors A and B of FIG. 2A. Each service processor may be configured to view a same set of components of the data storage system. For example, each service processor may view all storage devices and groups of storage devices of the storage system. Additionally, each service processor may also provide information regarding components viewed/visible locally or only by that service processor. For example, each service processor may provide a view of information regarding components used only by the service processor such as fans and power supplies used only by each service processor. To provide a complete, consistent and consolidated view of the data storage system configuration from both service processors, processing may be performed by a service processor to aggregate information locally by the service processor along with information collected from the other service processor. For example, service processor A may be the master and perform such processing by collecting a local view of configuration information as viewed by service processor A and also requesting and obtaining configuration information as viewed by service processor B. Service processor A may perform processing to combine both its local view and the view in connection with the configuration information collected from service processor B. To perform such collection, the service processors may communicate using connection 806 described above and then perform consolidation processing to combine the collected data into a single consolidated view of the data storage system configuration.

The techniques herein may also be used in an embodiment as described above based on the active/passive or master/slave SP model. However, an embodiment in accordance with techniques herein may utilize other SP models in connection with providing the consolidated view. For example, as a variation to the foregoing, an embodiment in accordance with techniques herein may implement an active-active model in connection with providing a consolidated view of data storage configuration information. In the active-active model with the multiple SPs of a data storage system, a request from a client for the data storage configuration information may be provided by any of the SPs at any time thereby having any SP provide the consolidated view in accordance with techniques herein at any time depending on which SP services a client's request. As a further variation in an embodiment which has more than 2 SPs, an embodiment may designate a portion of the SPs as active in connection with servicing a client request at any time, where the portion may be less than all of the SPs but more than a single SP. In such embodiments in a data storage system having multiple SPs, each SP of the data storage system may collect and consolidate configuration from every other SP and perform techniques described herein to provide a consolidated view of the data storage system across the multiple SPs.

What will be described in following paragraphs are techniques that may be used in connection with software components to gather data from multiple nodes in accordance with a first data model, and then perform processing to map or translate the collected data in the first data model to a second different data model. The second data model may place the data in accordance with a format and structure consumable or usable by a client such as a user interface that displays the resulting data of the second data model to a user. The first data model may, for example, utilize data in a form as reported by drivers or other lower level components. The second data model may also be referred to as a client data model. In connection with techniques herein, the second data model may be a virtual table or view. In processing or mapping data from the first data model to the second data model, an intermediate layer and also intermediate object model may be utilized. The objects of the first data model and intermediate object model may be object-based models using database tables. The objects of the client data model may be included in virtual tables or views.

As mentioned above, the techniques herein may be used with an object-based model using database tables and virtual tables. In particular both the first and second data model (as well as the intermediate object model) may be different object-based models using different set of tables. In such an embodiment using an object-based model, a row in a table (e.g. where the able may be a virtual or database table) may correspond to an object instance and each column in the table may correspond to an attribute or property of the object. The object may correspond to, and represent the state of, a physical or logical entity in the data storage system. For example, depending on the model, an object may represent a physical component such as a fan, power supply, port, logical storage device, or physical storage device. The physical and/or logical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

Figure 3:
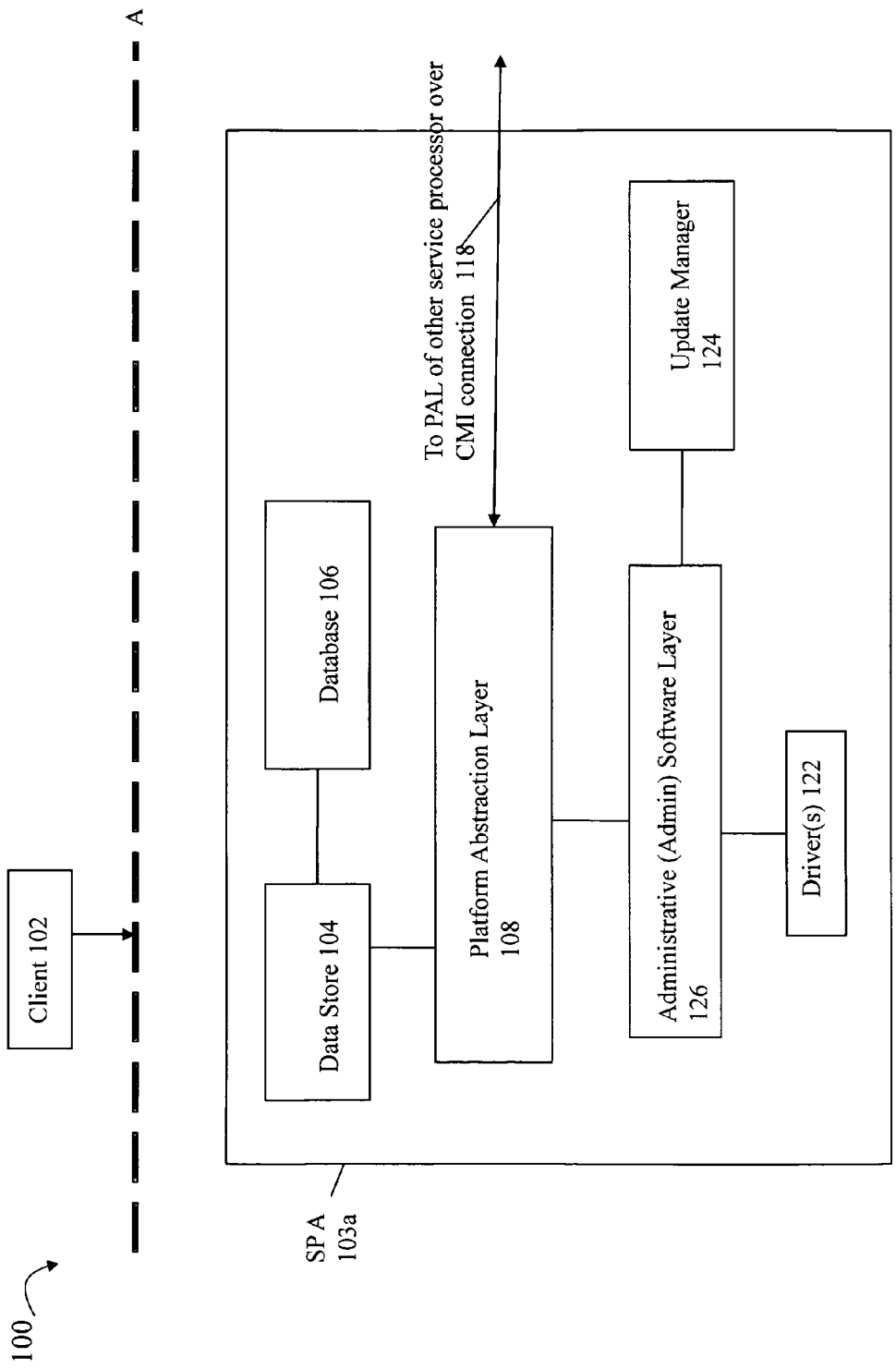
FIG. 3 is an example of software components that may be included in an embodiment in accordance with techniques herein.

Referring to FIG. 3, shown is an example of software components that may be included in an embodiment in accordance with techniques herein. The example 100 includes components of the data storage system and an external client 102. As described in more detail below, the components of 103*a* may be used in connection with mapping data of first data model to a second data model. The dashed line denoted as A may represent a partitioning of components included in the data storage system (e.g., those below the dashed line A) and those which are external to the data storage system (e.g., those above the dashed line A). The example 100 includes a remote or external client 102 and components 103*a* of one of the service processors, SP A of the data storage system. It should be noted that although an instance of the components of 103*a* are illustrated with respect to only a single service processor A, each other service processor of the data storage system, such as service processor B, may also include an instance of the components of 103*a*. Element 103*a* includes the following software components: data store 104, database 106, platform abstraction layer (PAL) 108, admin (administrative) software layer 126, and driver(s) 130. A client, such as external or remote client 102, may request to receive a consolidated logical view of components of the data storage system and may communicate with one of the storage processors A, B currently designated as the master. For example, assume processor A is the master processor.

The drivers 122 collect information of the local service processor A which is reported through a call stack of software layers including code of the admin software layer 126, PAL 108, and data store 104, where such information may then be stored in the database 106. The update manager 124 may generate a request to poll the drivers 122 of processor A and other processors for configuration state information. The update manager 124 may generate a polling request in response to an occurrence of an event such as an occurrence of a defined polling interval, as well as an occurrence of one or more other defined events. The update manager 124 may issue the request to the admin layer 126 which then obtains the local state information for processor A from the drivers 122. The admin layer 126 then communicates the state information for processor A to the PAL 108 which then communicates the information to the data store 104. Additionally, the admin software layer 126 may communicate with the PAL 108 of processor A to request configuration state information from processor B as illustrated by 118 and described below in more detail. The data store 104 may process the received state information (e.g., for both processor A and B) and then populates the database 106 by performing database operations such as by issuing appropriate database commands including update, insert and/or delete database commands.

In one embodiment described herein, the data store 104 may perform processing to map the collected data such as received from PAL 108 and the admin layer from an admin data model to another database model in accordance with the database 106. The admin data model may be referred to herein as the raw or admin data model where the collected data storage configuration data is in accordance with this admin data model such as used by the lower layers of software below PAL 108. The admin data model may be mapped to a database model of the database 106 (e.g. also analogous to the intermediate data model as may be referred to elsewhere herein). The database model may be further translated or mapped to the client data model which, as described in more detail elsewhere herein, may utilize virtual tables or views generated using queries run against the database tables of the database model and/or admin data model.

PAL 108 may serve as an interface facilitating communications between lower layers or software components (e.g., such as the admin software layer 126 and drivers 122) and upper layers or software components (e.g., such as the data storage 104 and database 106). Upon the occurrence of a polling interval as signaled by the update manager 124, PAL 108 of service processor A may collect data from the local processor A's drivers and may also communicate with other PALs included in other service processors (e.g., service processor B over the CMI connection 118). In turn, the PAL of processor B (not illustrated) queries its local processor B's drivers for the information in a manner similar to that as described for processor A and returns the information to the requestor, PAL of processor A. The requested information from both service processor A's drivers 122 and from other service processors (e.g., as communicated by PAL of processor B) may be returned to the PAL 108 of service processor A, forwarded to data 104 and then stored in database 106. The database of 106 for the collected configuration state information may include data stored in one or more database tables where such tables include one or more rows of data elements. The data store 104 may perform database operations which update the appropriate database tables of 106, and portions thereof, in accordance with the received state information. As described below, the data store 104 may use the techniques herein to map the collected data of the admin data model to data stored in the database 106 in accordance with the database model which is then further used to generate data in accordance with a client data model.

Figure 4:
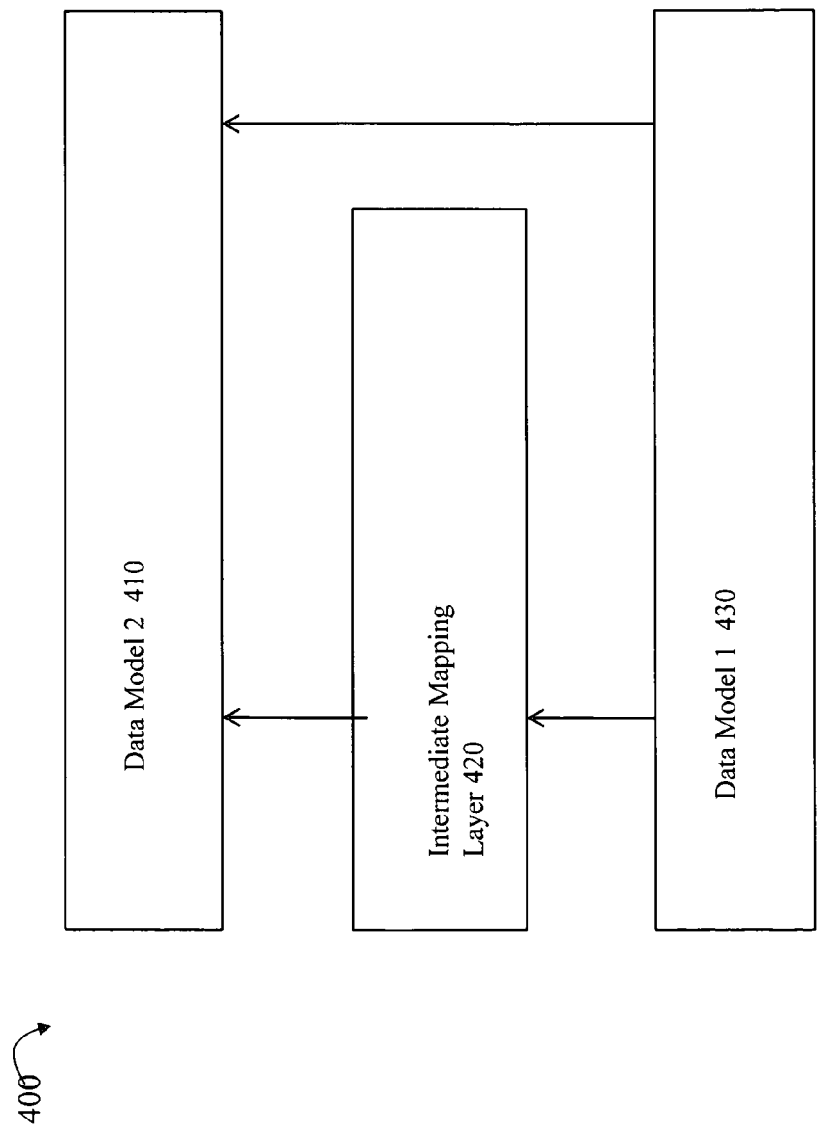
FIGS. 4 and 4A are examples illustrating mapping that may be performed using an intermediate mapping layer in an embodiment in accordance with techniques herein.

Referring to FIG. 4, shown is an example illustrating the general processing that may be performed in an embodiment in accordance with techniques herein. The example 400 includes data model 1 430 (such as the admin data model as at a first or lower layer), an intermediate or secondary mapping layer 420 (which may use an intermediate object model such as the database model mentioned above) and data model 2 410 (such as the client object data model at a third or highest layer). The techniques herein utilize the intermediate layer 420 in connection with mapping or translating first objects of the first data model 430 to second objects of the second data model 410. The data model 1 430 may represent the data model of the admin layer of the collected poling configuration information. Each time a new set of the collected data is received, processing may be performed to map the objects in the first data model 430 to objects of the intermediate mapping layer 420. Additional processing to generate objects of the second data model 410 (e.g., using objects of layers 420 and/or 430) is not performed unless and until there is a request for one or more selected client model objects, where such selected client data model objects are generated "on-demand" (e.g., on the fly) in response to the request using one or more objects from the collected data of the first data model 430 and/or one or more objects from the intermediate mapping layer 420. The techniques herein take advantage of maintaining an up to date intermediate mapping layer 420 set of objects so that when a request to generate an object in accordance with the client model (data model 2) is received, at least some of the processing steps have already been performed/intermediate values obtained through the foregoing use of the intermediate mapping layer 420. In other words, the processing necessary to generate objects of the second data model 410 from objects of the first data model 430 may be partitioned so that the intermediate mapping layer 420 performs at least part of such processing. The remaining processing necessary to generate selected objects of the second data model may be performed on demand/as needed in response to a request for such selected objects.

The foregoing use of the intermediate mapping layer 420 is an alternative, for example, to waiting until the request is received prior to performing all processing necessary to generate the requested objects in the second data model. The foregoing use of the intermediate mapping layer 420 is also an alternative, for example, to generating and maintaining a complete up to date (e.g., cached) set of objects of the second data model. In this latter case without using the intermediate mapping layer, each time a new set of data is collected such as at each polling interval, processing is performed to update the cached set of objects of the second data model in accordance with data changes and data dependencies on such changes. This may be performed even if there is no request for the objects in the second data model and may consume an unacceptable amount of resources in terms of memory usage, processing time, and the like. As will be described in more detail below, an embodiment may have a first layer of software that generates objects of the first data model, a second layer of software that performs processing of the intermediate mapping layer 420 (e.g. which may include generating one or more intermediate objects in accordance with an intermediate object model), and a third layer of software that performs processing to generate objects of the second data model (e.g., using one or more objects generated by the intermediate mapping layer 420 and/or objects included in the first data model 430 generated by the first layer of software). An embodiment may also implement a variation of the foregoing where one or more objects of the second data model may be generated by the second or intermediate mapping layer as well as the third layer and/or one or more intermediate objects (e.g. not included in the first or second data models) may be generated by the third layer as well as the second or intermediate mapping layer.

Various examples and embodiments are set forth below. In one embodiment set forth below, such as described in connection with FIGS. 5, 6, 6A, 6B and 6C, the second or intermediate layer may populate database tables including association database tables. Such association database tables may group objects together, such as in pairs, based on relationships between objects included in a pair. In this case, the processing performed by the second or intermediate layer may include computing and updating such relationships as needed in response to changes or updates as received for objects of the first data model (e.g., data model 1). As described below, the differences in data obtained between two successive polling intervals may be determined by a first software layer such as the admin layer and, the second or intermediate layer may perform processing responsive selectively to only such differences (e.g., based on dependencies of objects used by the second/intermediate layer upon such differences). The intermediate layer may selectively compute the associations based on such differences rather than, for example, computing and updating all associations and rather than, for example, computing and updating complete objects that may be referenced in the association. As will be apparent to those of ordinary skill in the art, use of such associations (as represented using association database tables in examples below) provide an advantage of a reduction in computation time when used in generating an object of the second data model (e.g., data model 2, 410 such as the client data model) when requested/on demand. Furthermore, as also described below, an association database table may utilize only two primary keys per association/relationship represented by a row of the database table, where each of the primary keys identifies an object of the pair being associated with the other object of the pair. By storing the association database table including information representing the relationship between objects rather than requiring each such object of the relationship (where such objects may be included in the second data model) to also be maintained and stored, the amount of memory used and computation performed in response to each polling update may be greatly reduced. Thus, the techniques herein provide an advantage of scalability.

In connection with an embodiment in accordance with techniques herein, communications between an initiator port of the host and a target port of a data storage system may include those related to I/O operations, for example, read and write SCSI operations. The foregoing communications between the host and data storage system may be transmitted over a path or connection defined by two endpoints—the initiator port of a host and the target port of the data storage system. The admin data model may collect information on a connection or a per path basis. In other words, the admin layer may collect data with respect to physical connections. The objects of the admin data model may reflect this level of granularity and concept of paths or connections. However, the admin data model (e.g., corresponding to data model 1 430) may not have objects which correspond to other physical and/or logical entities in the storage system such as a host, storage group, and the like. For example, the admin data model may include a single large path or connection object with information about the initiator port, host including the initiator port, target port, and the like. Information regarding other entities such as the host may be included or embedded as properties of the path objects. However, objects of the client data model consumable by a client (e.g. corresponding to data model 2 410) may have other entities including logical entities as the host, storage group, and the like, which may be populated by aggregating, analyzing and/or selectively extracting data with respect to many path objects of the admin data model. For example, the user may request a list of hosts, a list of ports on a particular host, a list of all host ports, a list of all target array or data storage system ports, and the like. The client data model may include, for example, a host object, initiator object, port object, storage group object, and the like, as basic elements since such elements as objects are usable in connection with client requests. In order to generate the many different objects of the client data model, multiple or all instances of admin data model path objects may be processed and then selected information may be extracted from one or more such path objects. For example, information reported for each connection or path as may be included in a single instance of a path or connection object of the admin data model may include a host identifier, host IP address, WWN or identifier of an HBA including an initiator port, target port identifier, storage group of LUNs visible through a port, login session, and the like. In accordance with techniques herein, the objects of the admin data model are transformed using the intermediate layer and one or more intermediate layer objects may be generated representing the partial processing described above. As described below, the intermediate layer objects may include, for example, associations and also intermediate calculations or intermediate processing results performed in advance of the request to generate one or more client model objects produced using such intermediate results (e.g., dependent on the intermediate results). The associations of the intermediate or second layer 420 may define some basic relationships (e.g., between a host and initiator, host and storage group, initiator and path, path and target, path and session, preferred path for particular host, and the like) used for determining information for one or more client data model objects, such as one or more hosts and associated host information, information about which initiator ports are on a host, providing a list of initiator ports or target ports, and the like. Thus, the associations may be maintained and kept up to date in response to each polling interval. However, the remaining processing which may use such associations to extract further information about a particular one or more hosts, initiators, or target ports, and the like, in response to a user request is not performed until such a request is actually received (e.g. on demand). Additionally, the processing may be performed only to generate the objects of the client data model necessary to service the request. Furthermore, in one embodiment, the objects of the client data model generated may not be cached but may rather be generated on demand in response to each request. However, the objects generated by the layers 420 and 430 may be stored, for example, in memory and/or non-volatile storage for subsequent use and updated in response to data received at each polling interval (e.g. next set of collected data in the admin data model). The objects of the client data model 410 may be generated using predefined commands which utilize objects of the layers 420 and/or 430. In an embodiment in which the objects used by 420 and 430 are stored in database tables, the commands may be queries (e.g., such as SQL database queries) to generate views corresponding to the objects of the client data model. The queries may use, for example, INNER JOIN clauses to join multiple database tables and extract the necessary information from objects of layers 420 and/or 430.

The application described herein with respect to an admin data model of objects transformed into another set of objects of the client data model is one exemplary use of the techniques herein with the intermediate mapping layer. Using such techniques as described below in more detail, a large object corresponding to a connection or path in the admin data model may be mapped to many different smaller objects of the client data model.

Figure 4A:
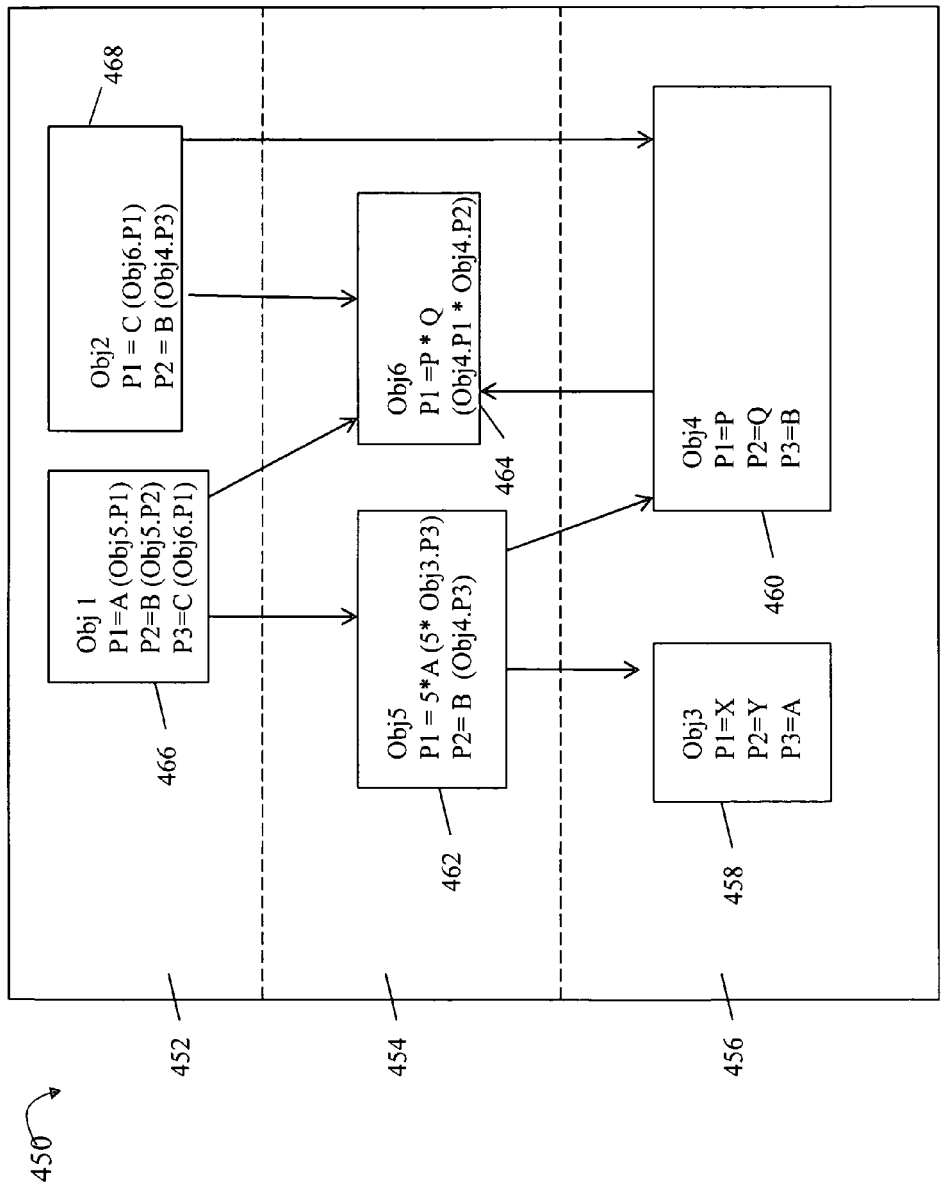

Referring to FIG. 4A, shown is an example illustrating some uses of the intermediate mapping layer in translating objects of a first data model to objects of a second different data model. Elements 452, 454 and 456 correspond, respectively, to the layers 410, 420 and 430 of FIG. 4. Elements 458, 460 are objects of the first data model used by layer 456 such as, for example, those of the admin data model. Elements 462, 464, are objects generated by the intermediate layer 454 and may be in accordance with an intermediate object model. Elements 466, 468 are objects of the second data model used by layer 452 such as objects of the client data model. In the example 450, each object (denoted "obj n") may have one or more properties or attributes (denoted as "P1", "P2", etc. in each illustrated object). For example object 458 is obj3 having attributes denoted by P1 through P3 with corresponding values of X, Y and A. Objects of layers 452, 454 include parenthetical expressions next to each property value where such parenthetical expressions denote how the particular property values may be derived using one or more property values of other objects at other levels, performing mathematical calculations, and the like. For purposes of notation, an attribute or property value, Pn, of an object instance, ObjM, is represented as ObjM. Pn. An arrow from a first object to a second object indicates that the first object depends on or may reference one or more property values of the second object.

As described above in an embodiment in accordance with techniques herein, objects of layer 456 may be received, for example, in response to a polling interval or other event occurrence. In response to receiving such objects of 456, processing may be performed by the intermediate layer 454 to generate objects 462, 464 using one of more objects of layer 456. Objects of layer 452 are not generated unless and until there is a request for such objects. When such a request is received, for example, for objects 466, 468, processing is performed to generate these objects 466, 468, using any one or more objects 462, 464, 458 and/or 460 of lower layers 454, 456. In this example, object 462 may be generated to include property P1 produced by extracting data from Obj3. P3 (e.g., object 458 of layer 456) and then multiplying this value by 5, and a property P2 produced by extracting data from Obj4. P3 (e.g., object 460 of layer 456). Object 464 may be generated to include property P1 produced by extracting data from Obj4. P1 and Obj4. P3 (e.g., property values of object 460 of layer 456). In particular Obj6. P1 and Obj5 P1 are mathematical products generated using one or more property values of objects from layer 456. An embodiment may perform such calculations as intermediate results prior to receiving a request for one or more objects of the layer 452 which may use the values of the intermediate results in order to expedite processing of the request once received. Additionally, a single instance of each mathematical product may be stored in objects of the intermediate layer which may be referenced multiple times in connection with generated objects of layer 452. By having only a single value stored in an object of layer 454, references to the single value by objects of layer 452 may be made as needed. Thus, storage or memory usage may be conserved since there is only a single copy of the mathematical product intermediate result. By having the products precalculated prior to receiving a request for any object that may reference the product, the request may be serviced faster than performing the calculation in response to receiving the request. Furthermore, since the objects of layer 452 are generated on demand, there is no need to cache or store the requested objects of layer 452 other then temporarily and then send the generated objects of layer 452 to the client or requester. Thus, caching storage may be conserved using the techniques herein over an implementation which may, in contrast to techniques herein, generate and cache all objects of 452 ahead of time prior to receiving a request.

In response to receiving a request for objects 466, 468, the requested objects may be generated using predetermined commands. Such commands may provide for automated extraction, calculations, and/or other processing of objects from 454 and/or 456 to generate values used to populate objects 466, 468. The foregoing are simplistic examples illustrating use of the techniques herein. For example, rather than performing a mathematical calculation by the second layer 454 for determining Obj5. P1, the property value may be determined as the result of processing data of hundreds or thousands of objects perhaps, for example, to find a largest value of one or more properties, provide summary information such as how many objects having matching attribute values, and the like. Such processing may be time consuming and may be completely or partially performed using the second mapping layer 454. In accordance with techniques herein, the processing of the mapping layer 454 may be performed in response to receiving an initial set of objects of layer 456 and also in response to any changes for such objects as may be communicated in a subsequently received updated data set for the objects of layer 456. The objects of 452 may be generated independently of when objects of layer 456 (or updated versions thereof) are received. By using the foregoing partitioning of processing and layers to generate objects of layer 452, changes to only objects of the second data model may be made while insulating or minimizing changes needed to other layers 454, 456 (both code and data objects used therein). For example, the layout of object 466 may change so that an additional property value Obj3. P1 (e.g., from object 458) is added. The updated object structure for 466 may be made by simply modifying the commands to extract data, for example, from object 458. Furthermore, objects or properties of objects, included in layer 454 may be selectively updated responsive to changes in objects used in layer 456. In this way, each object in 454 may be selectively updated/recalculated based upon objects of 454 that are dependent upon changes to properties/objects in 456. Similarly, objects and properties of 452 may be selectively updated dependent upon changes or updates to properties/objects of 454.

The foregoing example of FIG. 4A represents one general way in which the techniques herein may be used. To further illustrate other ways in which the techniques herein may be used, what will now be described is an example using the data storage configuration information and associations as may be used by the second or intermediate mapping layer in an embodiment.

Figure 5:
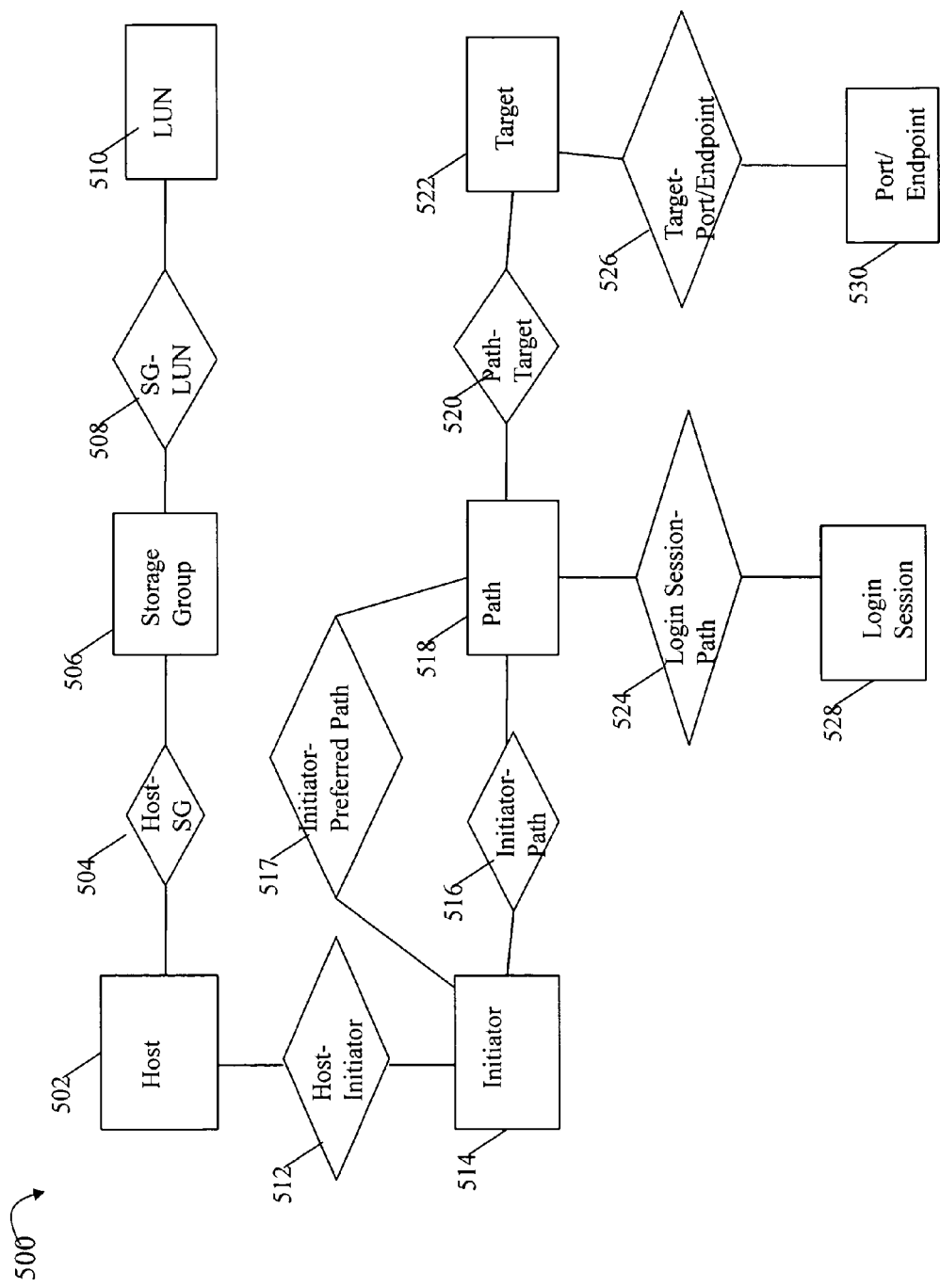
FIG. 5 is an example of objects corresponding to logical entities and associations that may be used in an embodiment in accordance with techniques herein.

Referring to FIG. 5, shown is an example of associations or relationships between objects that may be maintained in an embodiment in accordance with techniques herein. As will be described below, the associations may be maintained by the second or intermediate mapping layer. As a variation, one or more of these associations may also be generated on demand by the upper level processing layer. The example 500 includes rectangular elements corresponding to objects and diamond shaped elements corresponding to the associations between pairs of objects. As described above in an exemplary use of the techniques herein with data storage systems, data may be collected by the admin layer in accordance with a first data model which is mapped to a second client data model. The example 500 illustrates associations between objects of the second client data model that may be generated by the second or intermediate mapping layer. In other words, the second mapping layer may determine such associations or relationships between objects of the second data model although the actual instances of the objects of the second data model themselves may not be generated as part of the second or intermediate mapping layer processing. Rather, the objects of the second data model may be generated as described above on demand in response to receiving a request for the objects or other objects that may use such relationships.

The example 500 includes the following objects used in the second or client data model corresponding to logical or physical entities in the data storage system configuration: host objects 502, storage group (SG) objects 506, LUN objects 510, initiator objects 514, path objects 518, target objects 522, login session objects 528, and port or physical endpoint objects 530. Each instance of the host object 502 may represent a host such as host 14a of FIG. 1. Each instance of the LUN object 510 may represent a single LUN such as may be stored on one or more physical devices of the data storage system illustrated in FIGS. 1 and 2. Each instance of the SG object 506 may represent a logical grouping of one or more LUNs. Each instance of the initiator object 514 may represent an initiator port of a host, such as a port of an HBA of host 14a of FIG. 1. Each instance of the path object 518 may represent a path from an initiator to a target port of the data storage system. Each instance of the login session object 528 may represent a single SCSI session. Each instance of the target object 522 may represent a virtual port of the data storage system such as the system 12 of FIGS. 1 and 2. Each instance of the port or endpoint object 530 may represent the physical port in combination with the particular protocol utilized (e.g., iSCSI, FCoE (Fibre channel over Ethernet)), and the like. As known in the art in connection with the SCSI standard, a physical port may map to one or more virtual ports.

The example 500 includes the following association objects: host-SG 504, SG-LUN 508, host-initiator 512, initiator-path 516, initiator-preferred path 517, login-session-path 524, path-target 520 and target-port/endpoint 526. Each instance of the host-SG association 504 represents the relationship between an SG exposed or accessible to a host. Each instance of the SG-LUN association 508 represents the relationship of a LUN included in an SG. Each instance of the host-initiator association 512 represents the relationship of an initiator port of the associated host. Each instance of the initiator-path association 516 represents the relationship of an initiator included in an associated path. Each instance of the initiator-preferred path association 517 represents the relationship of a preferred path for the associated initiator. Multiple paths may exist between a host and a data storage system. Each such path may have an initiator on the same host and a target on the same data storage system. As such, when sending a data operation from a host including the initiator to the data storage system, the association 517 may represent the selected one of such multiple paths which is preferred for sending the data operation. The association 517 may identify the path instance as well as the initiator object associated with the path instance. The preferred path for a host may change over time based on a variety of different criteria such as, for example to load balance among the multiple paths, when any physical connections are non-functional (e.g., not performing data transmissions), and the like. Each instance of the login-session-path association 524 may represent the relationship of the particular session and associated path. Each instance of the path target association 520 may represent the relationship of the particular target of the associated path. Each instance of the target-port/endpoint association 526 may represent the relationship of the physical port or endpoint associated with a path target that is a virtual port. The foregoing are examples of associations that may be determined and maintained by the second or intermediate mapping layer in an embodiment in accordance with techniques herein.

As will be described in more detail below, consider, for example, an admin data model including a large path or connection object along with one or more other smaller objects. In generating the path object 518 of the client data model, one or more items of information may be extracted from one or more objects of the admin data model. The path object 518 of the client data model may have properties which map directly to one or more properties of objects in the admin data model's connection object. One or more commands may be specified which are executed in response to receiving a request requiring generation of the path object 518 of the client data model. The one or more commands may identify the locations in the objects of the admin data model where values are extracted and then used to populate the path model 518 of the client data model. In connection with the initiator-preferred path association object 517, the association may identify the particular one of the path objects which is preferred for sending transmissions from a host. The processing performed in connection with selecting or determining such a preferred path from among possible multiple paths in accordance with any specified selection criteria may require searching and/or analyzing information that may be included in many other objects. The intermediate mapping layer may perform such processing in response to receiving an instance of data in accordance with the admin data model and the association object 517 may represent the result of such processing for preferred path determination. In one embodiment, although there may be multiple candidate paths such as between a host and a data storage system, the initiator-preferred path association may be identify using the path identifier thereof the one path that may be presented to the user rather than, for example, providing the user with information on multiple such paths that may have a common host. The second mapping layer may perform such processing and determination in response to receiving new or updated objects of the admin layer in order to keep the preferred path for each host up to date with the latest received set of data storage configuration information. Thus the object 517 may associate a preferred or best candidate path with an initiator object but the identifier path may represent a preferred path for a host.

What will now be described with reference to FIGS. 6, 6A, 6B and 6C is additional detail of how an embodiment may represent objects of each layer in accordance with techniques herein. In particular, the example illustrates use of some objects including associations as described above. It should be noted that not all objects and associations described above are illustrated.

Figure 6:
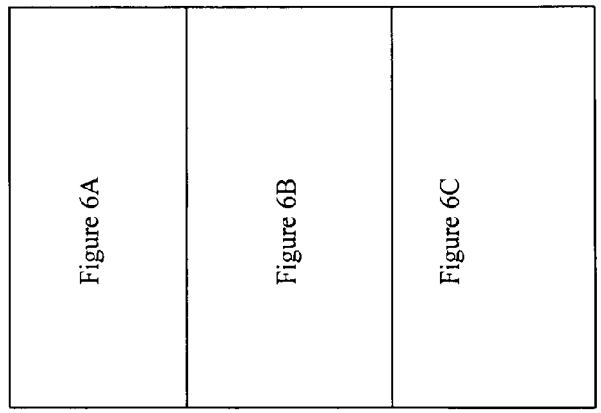
FIGS. 6, 6A, 6B, and 6C are examples illustrating objects that may be generated by different software layers at different points in time in accordance with techniques herein.
Figure 6A:
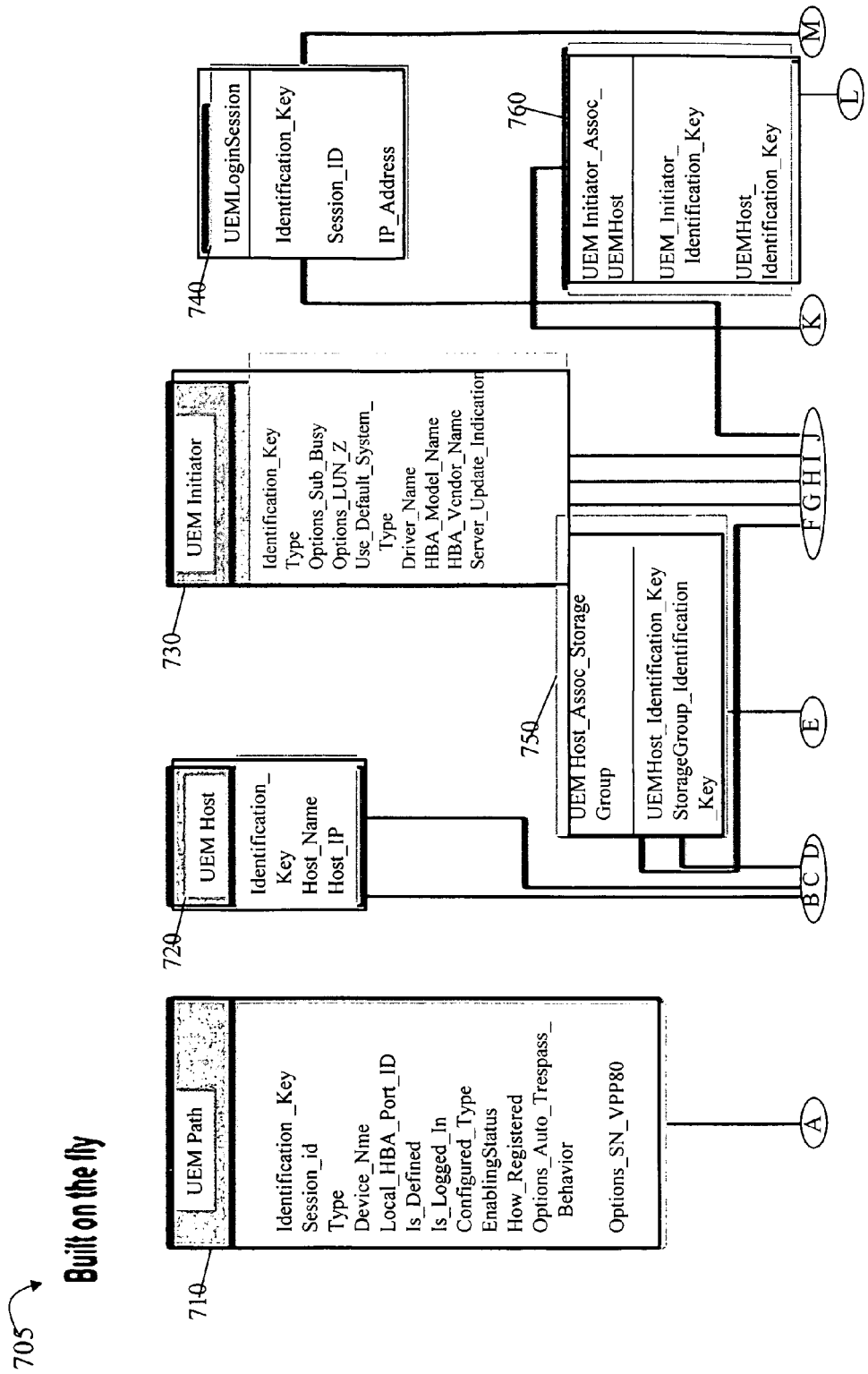
Figure 6B:
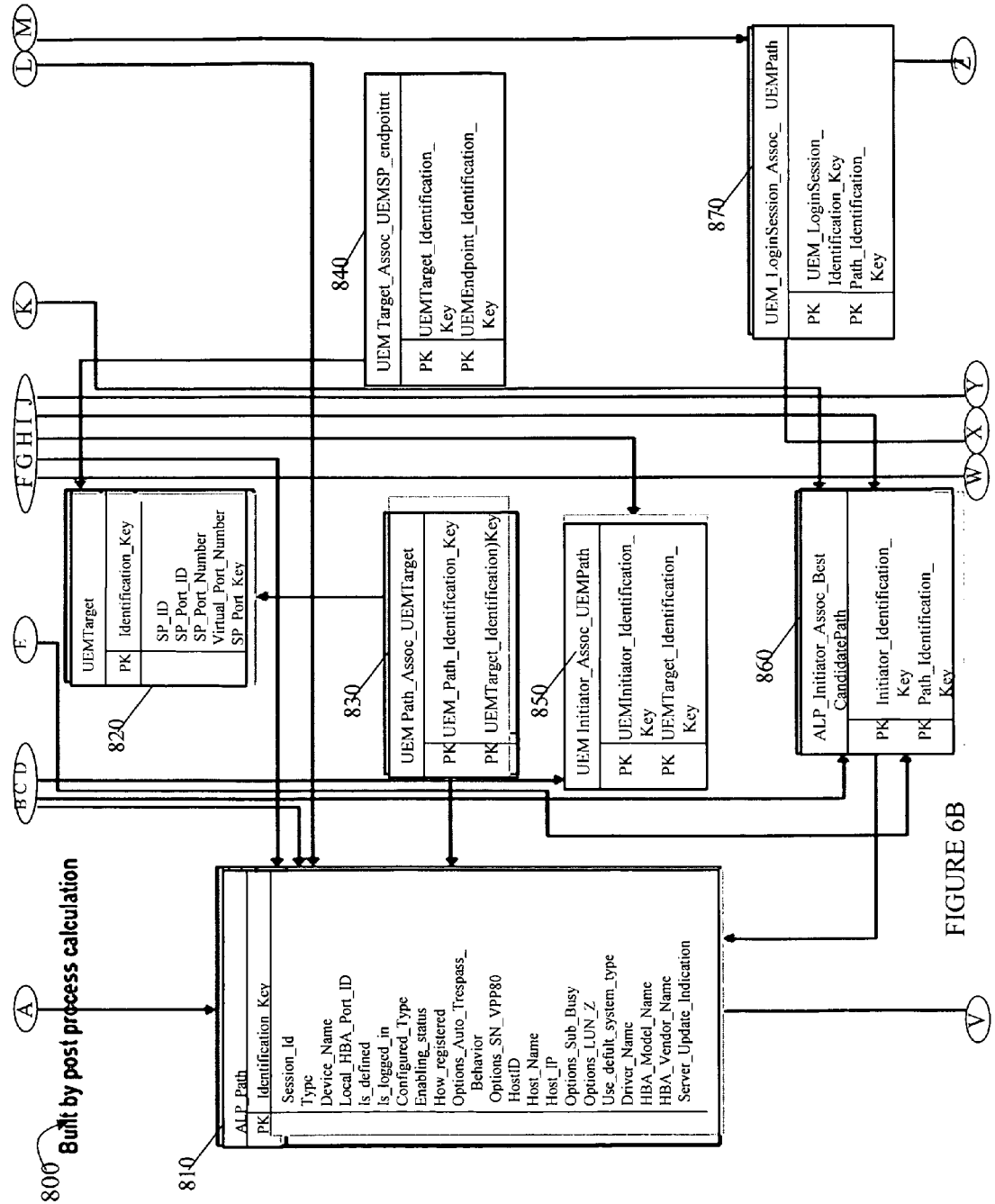
Figure 6C:
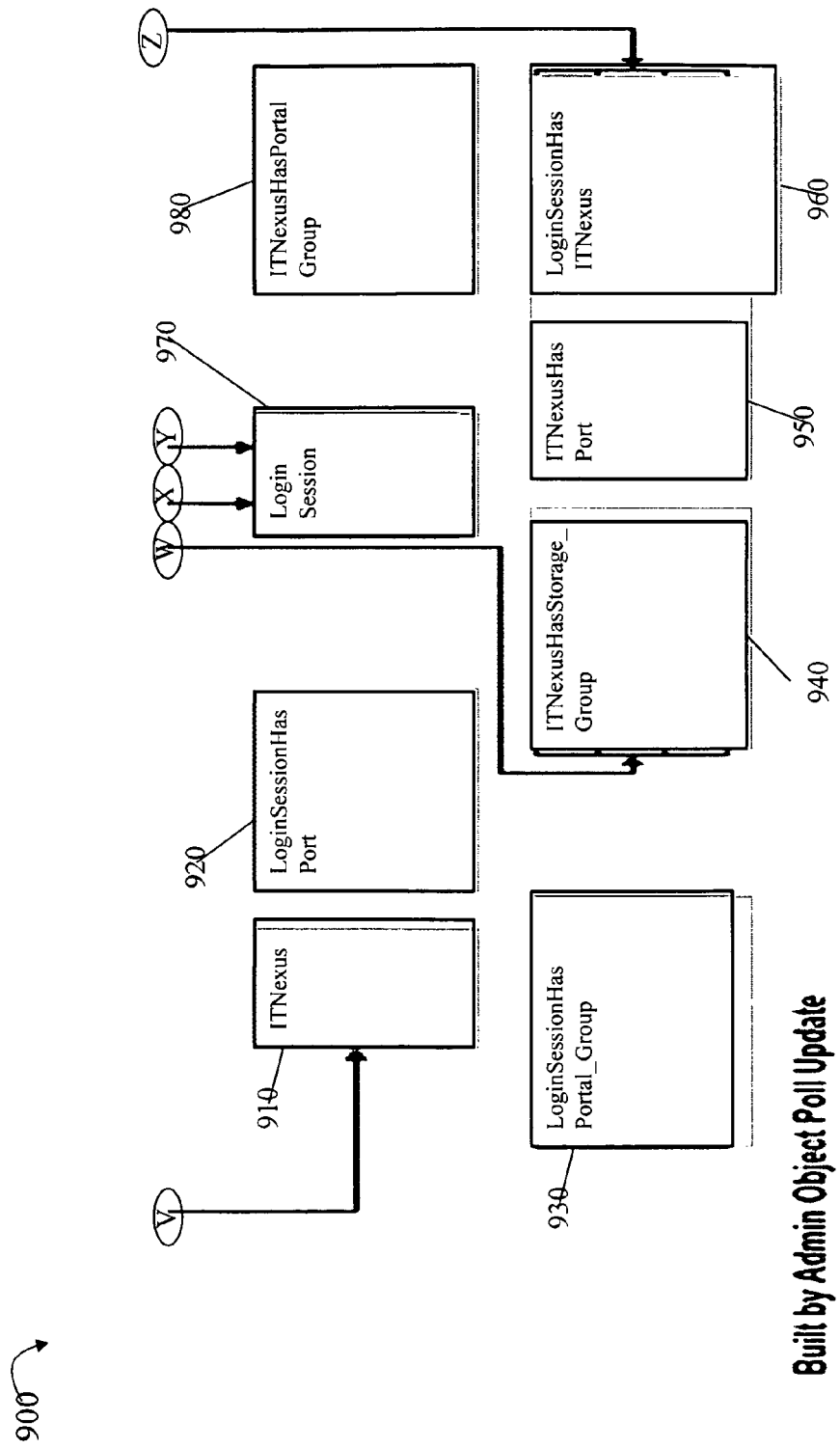

Referring to FIG. 6, shown is a map or layout of how following FIGS. 6A-6C may be arranged to illustrate objects that may be used in different models and layers in an embodiment in accordance with techniques herein. FIG. 6A represents objects that may be generated on demand in response to receiving a client request using objects generated by the second intermediate layer as illustrated in FIG. 6B and/or objects of the admin data model as illustrated in FIG. 6C. The following conventions should be noted with respect to FIGS. 6-6C. Objects are denoted by square/rectangular boxes having properties or attributes. An object name or type is indicated by the first line of text within the object (e.g., UEMPath of object 710 of FIG. 6A). Properties or attributes of an object are denoted by other named elements within the box representing the object (e.g., Identification_Key and Session_id are properties of object 710). A directional line from a first object to a second object denotes that the first object is dependent upon, may reference, or use information from, the second object. In this embodiment, objects generated by the second mapping layer in FIG. 6B and objects received for a collected data set of the admin data model of FIG. 6C may be stored in database tables having one or more primary keys (PKs). A property of an object which is a PK for a database table including that object is denoted by the PK designation by the attribute (e.g, Identification_Key is the PK for object 810).

It should be noted that the objects included in each of the FIGS. 6A-6C denote objects generated by each layer. However, in this particular example, there are instances where not all objects generated on demand or "on the fly" as illustrated in FIG. 6A are objects of the client data model. For example, as will be described below in more detail, element 750 is an association object which is not an object of the client data model. Rather element 750 may be characterized as an association object which is an intermediate object used to generate other objects of the client data model. Similarly, one or more objects generated by the second or intermediate mapping layer in response to receiving a new or updated set of data from the admin layer (e.g., as illustrated in FIG. 6C) may be objects of the client data model as well as intermediate objects of an intermediate object model used to generate objects of the client data model. For example, as will also be described in more detail below, element 820 of FIG. 6B is an object of the client data model. In this particular example, an embodiment may partition the generation of client data model objects to be performed on demand in response to a request for such objects and also maintained by the intermediate mapping layer in response to receiving a set of admin layer data as illustrated in FIG. 6C. In other words, object 820 of FIG. 6B has been selected as the single client data model object to be produced in accordance with each received set of admin layer data such as for each polling interval.

As indicated in FIG. 6A, objects 710, 720, 730, 740, 750 and 760 may be generated on demand in response to a request for these objects. Objects 710, 720, 730, and 740 may be included in the client data model. Objects 750 and 760 may be characterized as intermediate association objects which, although generated on demand, may be used to generate one or more other objects of the client data model. With reference back to FIG. 5, objects 710, 720, 730, and 740 may correspond, respectively, to path object 518, host object 502, initiator object 514, and login session object 528 of FIG. 5. Objects 750 and 760 may correspond, respectively, to association objects 504 and 512 of FIG. 5.

As indicated in FIG. 6B, objects 810, 820, 830, 840, 850, 860 and 870 may be generated by the intermediate mapping layer in response to receiving a new set of admin layer data. It should be noted that once an initial set of objects of FIG. 6B are generated, processing performed in response to a subsequent set of received admin layer data may include updating or deleting such existing objects in response to any detected changes (e.g., differences determined between the current and subsequent object sets), and also generating new objects in response to any such changes. Object 820 is included in the client data model and may correspond to the target object 522 of FIG. 5. Object 810 may be an intermediate object representing an abstraction of an original connection or path described by one or more objects in the admin layer objects of FIG. 6C. Objects 830, 840, 850, 860, and 870 are association objects and may correspond, respectively, to objects 520, 526, 516, 517, and 524 of FIG. 5. It should be noted that in this particular example illustrated in FIGS. 6A-6C, the object 860 represents an association similar to that as illustrated by 517 of FIG. 5 with the difference that the association object 860 does not directly identify or associate client data model objects such as using PKs corresponding to such instances. Rather, in FIG. 6B, the association object 860 may be characterized as indirectly associating client data model objects identified indirectly using the PKs of 860. For example, as described below in more detail, the Path_Identification_Key of 860 may identify a first object 810 rather than a second object 710 of FIG. 6A. However, each such second object 710 is derived from or based on values of a corresponding instance of object 810. In a similar manner, the Initiator_Identification_Key of 860 may denote a key used to indirectly identify a corresponding instance of UEM initiator 730. Alternatively, an embodiment may define object 860 to directly reference an actual instance of the UEM path object 710 rather than 810 and an instance of 730 using the PKs of 860.

As indicated in FIG. 6C, objects 910, 920, 930, 940, 950, 960, 970 and 980 may be objects included in the admin data model for data returned in response to a polling interval describing the current data storage configuration such as related to one or more paths.

Each association object included in FIGS. 6B and 6C includes only two primary keys associated with two other objects denoting the association or relationship between such object instances.

With reference to FIG. 6B, object 810 may be generated by extracting data from one or more objects of the admin data model objects of FIG. 6C. Similarly, other objects of FIG. 6B may be generated using objects from FIG. 6B and/or other objects of FIG. 6C (lower level or admin data model). The object generated by the middle layer in FIG. 6B and lower layer in FIG. 6C may be implemented as real database tables. The elements in the top layer generated on demand as illustrated in FIG. 6A may be views or virtual tables produced using queries of one or more tables in one or more of the lower layers (e.g. using objects from FIG. 6B and/or 6C). Another embodiment may alternatively implement the top layer using real or actual database tables.

At runtime during operation of the system, a set of admin data objects in accordance with the data model illustrated in FIG. 6C may be received upon the occurrence of every polling period. In response to receiving a set of such data, processing may be performed to determine differences with respect to the current set of data. In response to any determined changes or differences, the second or intermediate layer may perform operations to appropriately update, delete and/or create new objects with respect to those illustrated in FIG. 6B. No objects in FIG. 6A are yet created in response to the determined changes or differences in accordance with each new set of admin data model data received. Rather, selected one or more objects as illustrated in FIG. 6A may be created in response to receiving a client request in order to service the received request using the selected objects.

In the embodiment illustrated in connection with FIGS. 6, 6A, 6B and 6C in accordance with techniques herein, the admin software layer may receive a set of polling data such as illustrated in FIG. 6C. One or more post processing modules may be included in software of the intermediate mapping layer which selectively generate objects of FIG. 6B, as needed in response to changes between the currently received set of polling data and the previous set of polling data. With reference back to FIG. 3, the admin software layer 126 may receive the new set of polling data such as illustrated in FIG. 6C. Any changes/differences between the new set of polling data and the previously received set of polling data may be reported by the admin software layer to software of the intermediate layer (e.g., generating objects of FIG. 6B). In response to such differences in the received polling data sets of the admin data model only those data items in the intermediate layer (e.g., objects of FIG. 6B) dependent on the polling data differences are updated. In other words, not all objects in the intermediate/secondary layer of FIG. 6B are recalculated each polling period but rather only those objects of the intermediate/secondary layer dependent on such differences. To further illustrate, a first set of polling data (e.g., using objects of FIG. 6C) may be received by the admin layer and differences determined between the first set of polling data and a previously received set of polling data. For illustration purposes, assume a first data item from the admin data model is referenced/used in calculating only a second data item of the intermediate layer in an object of FIG. 6B. Responsive to this difference, only the second data item needs to be recalculated/updated if this is the only intermediate layer data item dependent on this polling data difference. With reference to FIG. 6B, for example, if the polling data difference results in an update to one of the data items in element 810, only those other data elements of FIG. 6B dependent on this changed data item of element 810 are recalculated/updated. More generally with reference to FIG. 6B, only those database tables, rows of the tables (e.g., objects), and/or portions of table rows (e.g, object properties) are updated as needed based on dependencies between these and the polling data differences (e.g., differences between polling results of the admin data model of FIG. 6C). In one embodiment, such polling data differences may be reported by the admin layer 126 to the data store 104 (or other code module) which may then appropriately update the database tables of the intermediate layer. Database triggers or another notification mechanism may be utilized to cause invocation of code (e.g. a handler) to recalculate/update appropriate data items of the intermediate layer in FIG. 6B responsive to differences/changes in the polling data as reported by the admin layer. For example, a first set of database trigger(s) may be set to fire indications responsive to data changes of object instances of the admin layer (e.g. objects of FIG. 6C). Such data changes to objects of FIG. 6C may occur in response to a polling data difference and may be reported by the admin layer to a code module of the intermediate layer registered as a handler to receive such indications from the admin layer. The handler of the intermediate layer may update, for example, instances of object 810 as needed. A second set of database triggers or other registration/notification mechanism may be utilized in connection with the second/intermediate layer (objects of FIG. 6B) whereby a second handler of the intermediate layer is registered to receive notifications (e.g., is invoked) responsive to changes in instances of object 810. The second handler may, for example, calculate, determine, and/or appropriately update other objects of FIG. 6B dependent on changes to object instances 810. To further illustrate, consider a polling update difference reported by the admin layer which results in removing a single path from objects of the admin layer. Responsive to this path deletion in the admin layer, a first registered code handler of the second/intermediate layer of FIG. 6B may be invoked which deletes a corresponding instance of object 810 from a path table of path objects of the intermediate layer. One or more database triggers or other forms of registration/notification may be set which fire indications to a second handler of the intermediate layer in response to changes to the path table used by the intermediate layer of FIG. 6B. The second handler may be a code module which recalculates other data items of objects of FIG. 6B dependent on the deleted path object of the intermediate layer. Such recalculations performed by the second handler may include, for example, selectively deleting a row of a database table including object instances 830 (e.g., defining the association between a path object and a target object for the path) and also deleting a row of a database table including object instances of 850 (e.g., defining an initiator association for the path object). However, because the deleted path is currently not designated as a best or preferred path, there is currently no corresponding object in a preferred/best path table of object instances 860 thereby the preferred/best path table is not updated since there is no data dependency in this table upon the deleted path object. As will be appreciated by those of ordinary skill in the art, selectively updating only those objects (or portions thereof) of the intermediate layer (e.g., FIG. 6B) dependent on changes included in the delta polling (e.g., differences in polling data instances of FIG. 6C) may provide an advantage of significantly increasing the efficiency in performing calculations/updates in order to maintain up-to-date information in the objects of FIG. 6B.

When generating structures of the second layer in FIG. 6B, the ALP_Path structure 810 may be created and populated using information from the lower layer admin data of FIG. 6C. Processing may continue to generate the remaining objects of FIG. 6B which, in this example, include object(s) of the client data model and also intermediate objects such as the associations used internally for processing. Such intermediate structures may not be exposed or published to code other than code which performs the techniques herein. Such structures may be local or internal which respect to code that performs processing herein. As described above in one embodiment, the objects of FIGS. 6B and 6C may be implemented using database tables where each entry in the table may correspond to an object instance. For example, with reference to FIG. 6B, there may be a table of ALP_Path objects (entries for objects of 810), a table of ALP_Initiator_Assoc_Best_CandidatePath objects (entries for objects of 860), and the like. Association object database tables may have a general form including two columns forming the primary key (PK) values of the table with no other data. This is because a typical usage of the association objects may be in connection with SQL queries to indirectly obtain information from another table such as the ALP_Path table. One or more of the PKs for an association object may be used, for example, in an INNER JOIN clause of an SQL statement in connection with generating objects of FIG. 6A. This is illustrated in following paragraphs and figures in an example below.

Generally with reference to FIGS. 6A-6C where objects of FIG. 6C are views or virtual tables generated by executing commands or queries to extract data for the views from the lower layer objects of FIGS. 6A and 6B, the lines connecting objects of FIG. 6C to other lower layer objects may represent the database tables used in connection with the INNER JOIN clauses of database queries to extract the necessary data from such tables in generating the objects of FIG. 6C. The commands may be, for example, SQL queries to extract data from lower layer database tables or other commands that may vary if the lower layer objects of FIGS. 6B and 6C are not implemented using database tables.

Figure 7:
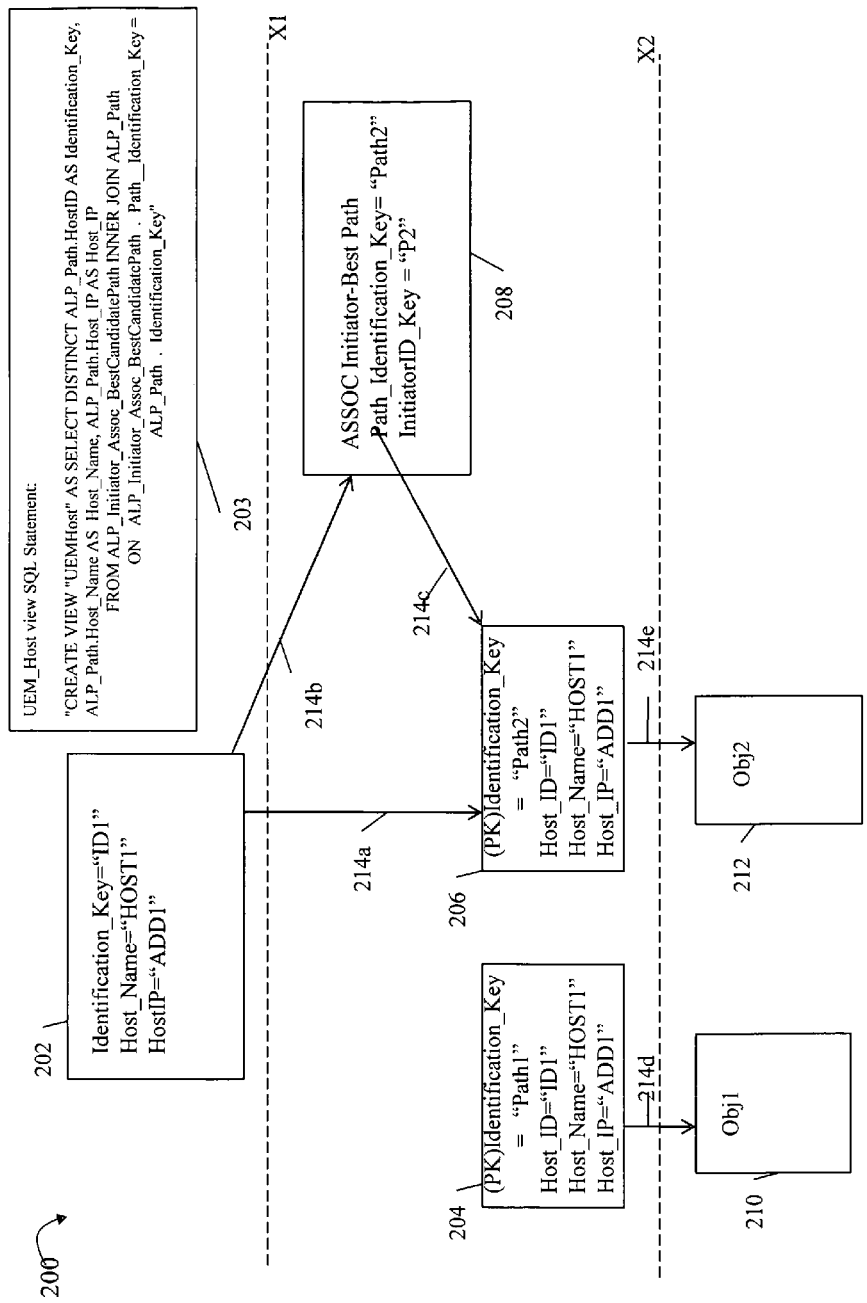
FIGS. 7, 8, and 9 are in connection with illustrating examples of generating an object in the client data model on demand using commands in an embodiment in accordance with techniques herein.
Figure 8:
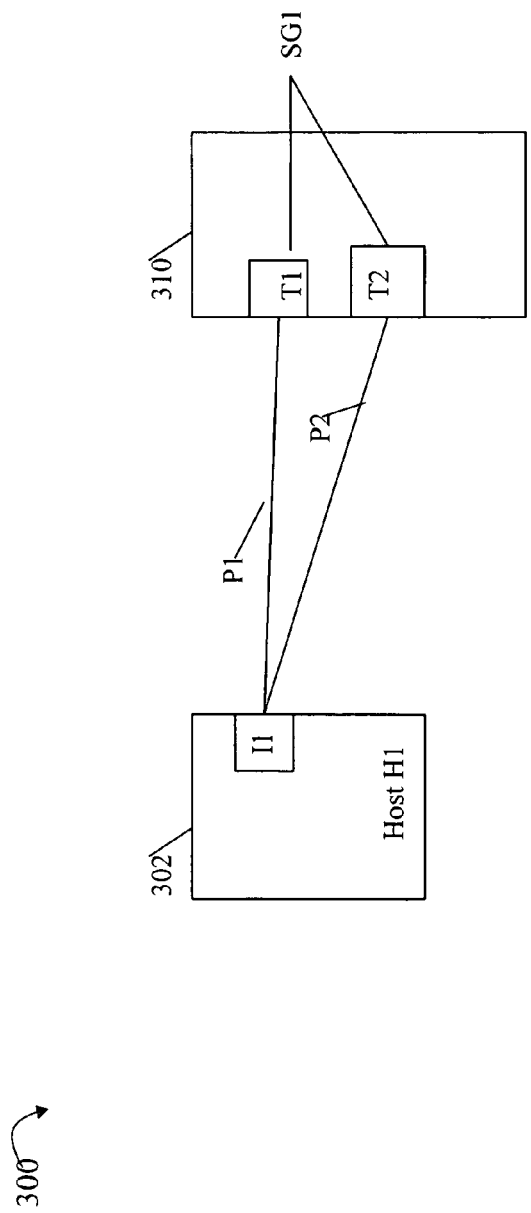

With reference to FIG. 8, consider a system which includes a single host 302 with two paths P1, P2 to data storage system 310. Path P1 has initiator I1 with target T1. Path P2 has initiator I1 with target T2. SG1 may be exposed or visible to the host 302 using paths P1 and P2. One of the foregoing two paths P1, P2 may be selected as a preferred of best path candidate for the host. To further illustrate use of techniques herein, reference is now also made to FIG. 7 which includes objects that may be generated by the different layers in connection with representing the foregoing two paths P1, P2 from a same initiator or HBA port of the same host 320 to the data storage system 310. Additionally, the example 200 illustrates an association used in connection with representing the best or preferred path for the host. In the example 200, lines X1 and X2 denote objects included in the three layers as illustrated and described above. Elements 202, 204, 206, 208, 210 and 212 represent object instances. Line X1 denotes that object 202 is generated on demand by the highest or uppermost layer The objects 204, 206, and 208 between lines X1 and X2 are generated by the intermediate or second mapping layer. The objects 210, 212 below line X2 are objects of the admin data model generated by the lowest or bottom most layer in response to receiving an admin data model data set, such as may be received in response to a polling interval occurrence.

The example 200 includes only a subset of objects as may actually be included in an embodiment for simplification and illustration of techniques herein. Additionally, the properties of the objects of FIG. 7 may correspond directly to those of FIGS. 6A-6C. Objects 210, 212 may be instances of object 910 of the admin data model used to generate respective instances of objects 204, 206. Objects 204, 206 may be instances of object 810 of FIG. 6B for two paths from the same host (e.g., as designated by the attributes Host_ID, Host_IP and Host_Name). Object 208 may represent an instance of association 860 denoting the best or preferred path from the two paths illustrated. It should be noted that an embodiment may present and determine a preferred path on a per host basis. Objects 204, 206 and 208 may be generated in response to receiving admin layer data including objects 210, 212. In this example, objects 204, 206 may be objects having corresponding entries or rows in the same database table "ALP_Path" in accordance with the naming convention for object instances 810 of FIG. 6B. Object 208 may be an object having a corresponding entry or row in database table "ALP_Initiator_Assoc_BestCandidatePath" in accordance with the naming convention for object instances 860 of FIG. 6B.

At some later point in time, a request is received for client object 202 which corresponds to an instance of object 720 of FIG. 6A. In response to receiving the request, the SQL command of 203 may be executed to extract the necessary date from one or more lower layer objects to generate the view for object 202. The object 202 is then transmitted to the requester. If another request is made for the same object 202, the object may again be generated using the same command of 203. The command of 203 is an SQL statement to create as a view an instance of a UEM_Host object 720:

1 "CREATE VIEW "UEMHost" AS SELECT DISTINCT ALP_Path.HostID AS
2 Identification_Key, ALP_Path.Host_Name AS Host_Name, ALP_Path.Host_IP AS Host_IP
3. FROM ALP_Initiator_Assoc_BestCandidatePath INNER JOIN ALP_Path
4 ON ALP_Initiator_Assoc_BestCandidatePath.Path_Identification_Key=
5 ALP_Path.Identification_Key"

A JOIN clause combines records (e.g. rows or entries) from two or more database tables resulting in a set that can be saved as a table or used as is. A JOIN is a means for combining fields from two tables by using values common to each. An INNER JOIN creates a new result table by combining column values of two tables (e.g. A and B) based upon the join-predicate. The query compares each row of A with each row of B to find all pairs of rows which satisfy the join-predicate. When the join-predicate is satisfied, column values for each matched pair of rows of A and B are combined into a result row. The result of the join can be defined as the outcome of first taking the Cartesian product (e.g. intersection or cross join) of all records in the tables (combining every record in table A with every record in table B). All records which satisfy the join predicate are returned. The From clause of the Select statement of 203 as included in line 3 above lists the tables to be joined. Line 4-5 specify the predicate or criteria which must be satisfied using the ON keyword. For the matching joined table entry, the above statement in lines 1-2 denote the properties of the ALP_path object which are extracted and mapped to corresponding properties of the UEMHost object 202. The two tables that are INNER JOINed are ALP_Path and ALP_Initiator_Assoc_BestCandidatePath having matching entries meeting the criteria of the ON clause (e.g., ALP_Initiator_Assoc_BestCandidatePath.Path_Identification_Key=ALP_Path. Identification_Key"). Thus, the foregoing illustrates how an association may be used in connection with an INNER JOIN to extract information from objects of lower layers (e.g., intermediate and lower layer) to generate object 202 in the upper most layer.

In this particular example, there may be one preferred path designated per host and thus an embodiment may use such a preferred path to extract host information associated with the preferred path which is then presented to the user via the client data model host object 202.

Figure 9:
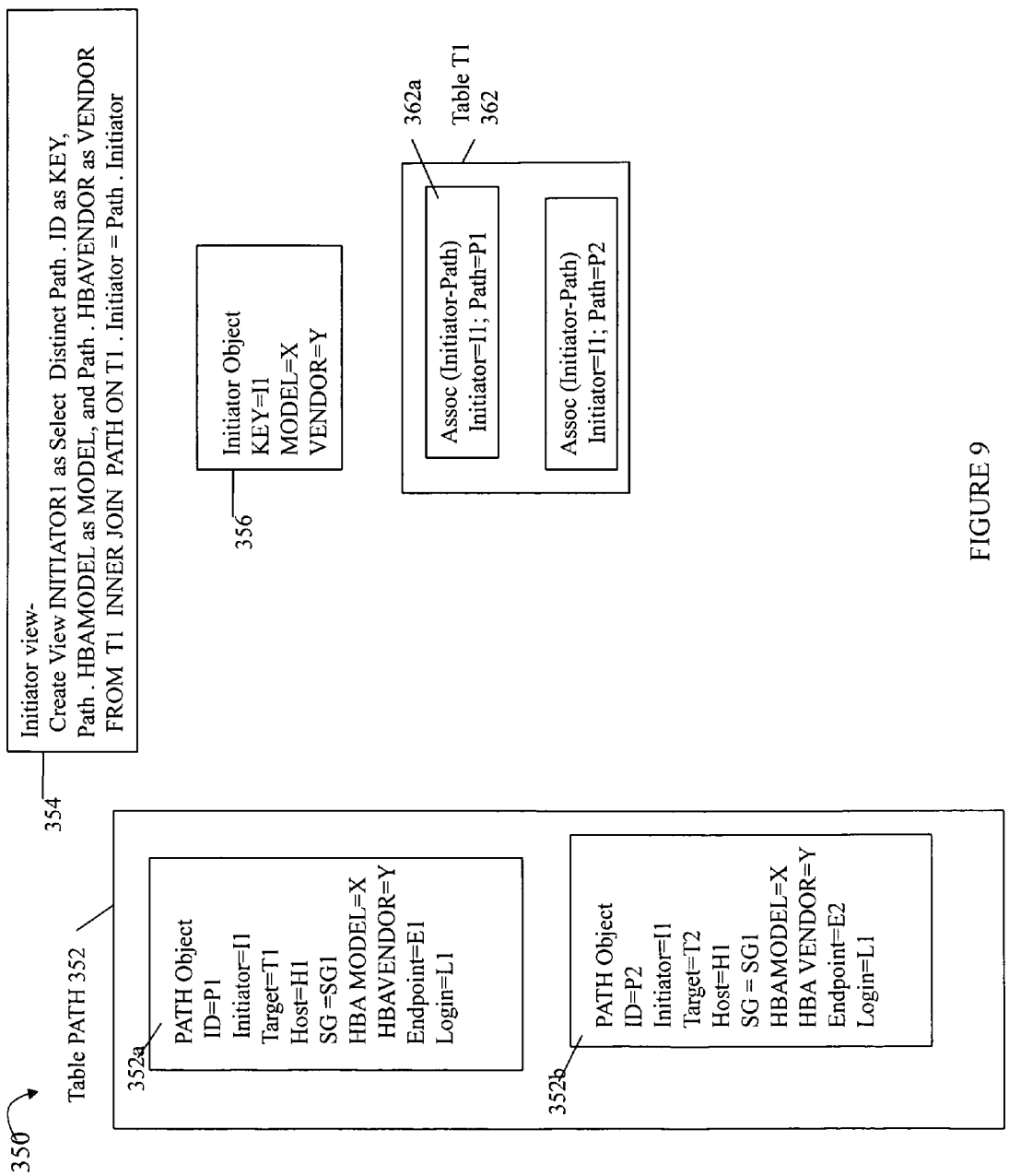

To further illustrate consider another example of FIG. 9. The example 350 of FIG. 9 illustrates additional objects that may be created in connection with representing the single common initiator for the two paths P1, P2 of FIG. 8. The path table 352 may represent the table of client object model path objects including objects 352a, 352b. In this example 350 of FIG. 9, the objects of path table 352 may be generated by the intermediate processing layer and stored in database tables. Table T1 362 may represent a table of initiator-path associations as used by the intermediate layer and may be implemented as an actual database table. Each objects of 362 includes two properties "Initiator" and "Path" denoting, respectively, an instance of a initiator object associated with a path object. The initiator object may be generated on demand by the upper-most layer using a command 354 in the form of an SQL statement/query.

In this example, the client object model initiator object 356 may be generated as a view or virtual database table by executing the command of 354 to extract multiple values from a path object using an INNER JOIN clause as described above.

Figure 10A:
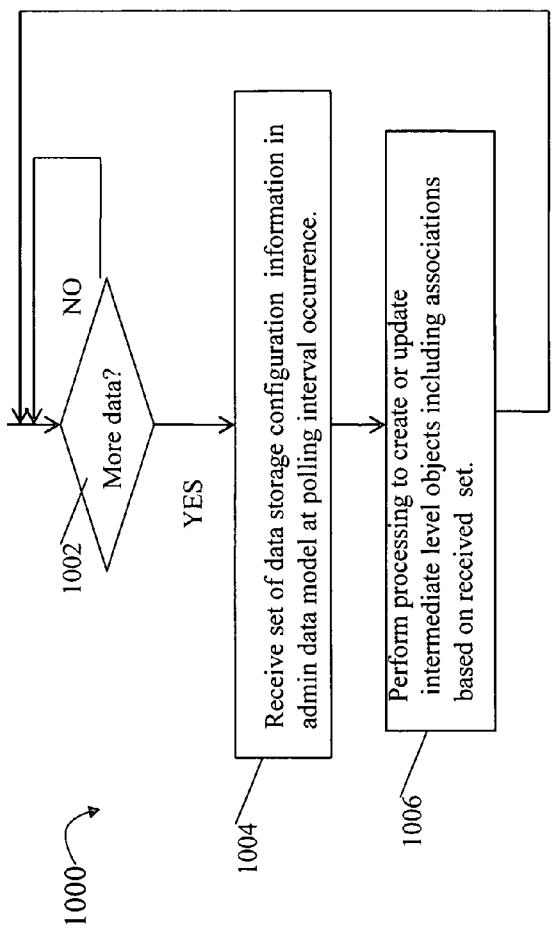
FIG. 10A, 10B are flowcharts of processing steps that may be performed in an embodiment in accordance with techniques herein.
Figure 10B:
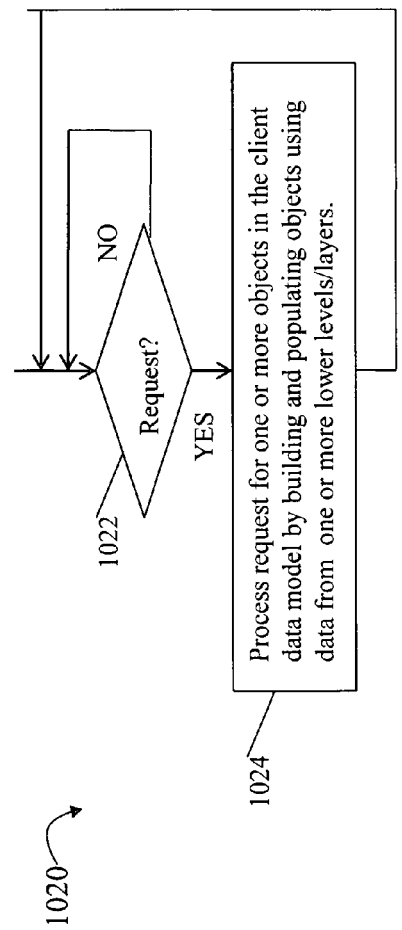

Referring to FIGS. 10A, 10B, shown are flowcharts of processing steps that may be performed in an embodiment in accordance with techniques herein. The steps of 1000 and 1020 summarize processing described above. The flowchart 1000 illustrates steps that may be performed in connection with processing data collected at polling intervals. At step 1002, a determination is made as to whether the next polling interval has occurred. If not, processing waits at step 1002 until such time has occurred when a set of data has been collected in accordance with the admin data model such as by the layer. At step 1004, the collected data in accordance with the admin data model may be received by the data store 104 of FIG. 3. At step 1006, the data store 104 or other module as may vary with embodiment may perform processing as associated with the intermediate or secondary mapping layer (e.g., 420 of FIG. 4) to create and/or update objects generated by the intermediate layer. Such objects may include associations and/or other intermediate objects not included in the second or client data model. Alternatively, an embodiment also have the second mapping layer generate one or more objects of the client data model. The foregoing may vary with embodiment and usage of the techniques herein. From step 1006, control returns to step 1002 to wait for the next set of collected data in accordance with the admin data model.

With reference to FIG. 10B, shown is a flowchart of processing steps that may be performed in an embodiment of the techniques herein to process a received request for one or more client data model objects. At step 1022, a determination is made as to whether a request for one or more client data model objects has been received. If not, processing waits at step 1022 until such a request is received. In response to receiving the request, control then proceeds to step 1024 to processing the request for one or more objects of the client data model. Step 1024 may include generating the requested client objects using one or more objects generated by the intermediate layer or otherwise included in the collected data of the lowest layer in accordance with the admin data model. Step 1024 may include generating one or more client model data objects on demand such as using commands to extract the necessary data as described above by generating views from real database tables including objects generated by layer 420 or included in the admin data model.

An embodiment utilizing the techniques herein as described above may utilize less memory because of reduced data redundancy. The foregoing may be realized because the amount of data retained such as in the database table to generate objects of the client model is reduced by using database views to generated objects of the client data model on demand. There may be an improvement in response times for generating the requested client data model objects. Additionally, the amount of processing time of an embodiment in accordance with techniques herein may be less than, for example, generating and maintaining a complete set of client model data objects in cache. The techniques herein are flexible and may support multiple and varied client models. Additionally, because the partitioning as described herein, changes made to the secondary or intermediate mapping layer may be made without impacting the software layers below. Problem detection and diagnosis may be performed using the preserved raw data of the admin data model as well as the highly reproducible client data model objects such as through the use of the commands to generate the objects as a view.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for mapping a first set of objects in a first data model to a second set of objects in a second data model, the method comprising:
   receiving the first set of objects;
   in response to receiving the first set of objects, generating a third set of objects using the first set of objects, the third set of objects including a plurality of association objects, each of the plurality of association objects representing an association between a first object in the second set of objects and a second object in the second set of objects;
   providing a command set of one or more commands for generating the second set of objects, wherein said one or more commands extract information from one or more objects included in any of the first set and the third set;
   receiving a request for one of the objects in the second set; and
   in response to receiving the request, executing one or more commands from the command set to generate said one object, wherein database tables include at least the third set of objects and at least a first of the one or more commands is a database query which joins rows from a plurality of the database tables, a first of the plurality of database tables including the plurality of association objects of the third set, each of the plurality of association objects including a primary key identifying an object of the second set associated with another object of the second set, wherein said primary key is specified in criteria of the database query for determining whether to join a row from the first of the plurality of database tables with a row from a second of the plurality of database tables.

2. The method of claim 1, further including:
   receiving an updated set of objects in the first data model, said updated set being an updated version of the first set of objects;
   determining differences between the updated set of objects and the first set of objects; and
   updating the third set of objects in response to the differences determined.

3. The method of claim 2, wherein a selected one or more commands in the command set for generating a selected one or more objects in the second set are executed only in response to a received request for the selected one or more objects.

4. The method of claim 2, wherein the updated set is received in response to a polling interval occurrence.

5. The method of claim 1, wherein said third set of objects includes an object having a first property determined in accordance with a plurality of values of one or more properties from one or objects in the first set.

6. The method of claim 5, wherein the first property is based on a mathematical calculation using the plurality of values.

7. The method of claim 1, wherein the first set of objects includes objects describing paths for sending data from an initiator to a target.

8. The method of claim 7, wherein the third set of objects includes a first association object representing a preferred path associated with a first initiator, said preferred path being selected from one of a plurality of paths to a same host, wherein first processing is performed to determine said preferred path as part of processing performed in response to receiving the first set of objects.

9. The method of claim 7, wherein the request is for selected ones of the second objects presented using a user interface.

10. The method of claim 1, wherein the first set of objects are stored in the database tables and the command set includes one or more queries for generating each of the objects in the second set using any of the database tables.

11. The method of claim 10, wherein the third set of objects includes at least one object in the second data model generated in response to receiving the first set of objects, said at least one object being stored in one of the database tables.

12. A system comprising:
   a host set of one or more hosts, each of the hosts including one or more initiator ports;
   a data storage system including one or more target ports, a storage group of one or more storage devices being accessible through said one or more target parts from said one or more initiator ports, a plurality of paths being formed between the host and the data storage system, each of the plurality of paths being defined from one of the initiator ports to one of the target ports;
   a computer readable medium comprising code stored thereon for mapping a first set of objects in a first data model to a second set of objects in a second data model, the computer readable medium comprising code stored thereon for:
  receiving the first set of objects including objects describing the plurality of paths;
  in response to receiving the first set of objects, building a third set of objects using the first set of objects, the third set of objects including a plurality of association objects, each of the plurality of association objects representing an association between a first object in the second set of objects and a second object in the second set of objects;
  providing a command set of one or more commands for generating the second set of objects, wherein said one or more commands extract information from one or more objects included in any of the first set and the third set;
  receiving a request for one of the objects in the second set; and
  in response to receiving the request, executing one or more commands from the command set to generate said one object, wherein database tables include at least the third set of objects and at least a first of the one or more commands is a database query which joins rows from a plurality of the database tables, a first of the plurality of database tables including the plurality of association objects of the third set, each of the plurality of association objects including a primary key identifying an object of the second set associated with another object of the second set, wherein said primary key is specified in criteria of the database query for determining whether to join a row from the first of the plurality of database tables with a row from a second of the plurality of database tables.

13. The system of claim 12, wherein the plurality of association objects includes an association object representing an association between one of the hosts and the storage group.

14. The system of claim 12, wherein the plurality of association objects includes an association object representing an association between one of the hosts and one of the initiator ports.

15. The system of claim 12, wherein the plurality of association objects includes an association object representing an association between one of the plurality of paths and one of the initiator ports.

16. The system of claim 12, wherein the plurality of association objects includes an association object representing an association between one of the plurality of paths and one of the target ports.

17. A non-transitory computer readable medium comprising code stored thereon for mapping a first set of objects in a first data model to a second set of objects in a second data model, the non-transitory computer readable medium comprising code stored thereon for:
  receiving the first set of objects;
  in response to receiving the first set of objects, updating at least a portion of a third set of objects using the first set of objects, the third set of objects including a plurality of association objects, each of the plurality of association objects representing an association between a first object in the second set of objects and a second object in the second set of objects, said updating including determining differences between the first set of objects and a data set including a previous version of the first set of objects, said updating including selectively performing operations to update, delete and create objects of the third set based on dependencies of the third set upon the differences;
  providing a command set of one or more commands for generating the second set of objects, wherein said one or more commands extract information from one or more objects included in any of the first set and the third set;
  receiving a request for one of the objects in the second set; and
  in response to receiving the request, executing one or more commands from the command set to generate said one object, wherein database tables include at least the third set of objects and at least a first of the one or more commands is a database query which joins rows from a plurality of the database tables, a first of the plurality of database tables including the plurality of association objects of the third set, each of the plurality of association objects including a primary key identifying an object of the second set associated with another object of the second set, wherein said primary key is specified in criteria of the database query for determining whether to join a row from the first of the plurality of database tables with a row from a second of the plurality of database tables.

18. The non-transitory computer readable medium of claim 17, wherein a selected one or more commands in the command set for generating a selected one or more objects in the second set are executed only in response to a received request for the selected one or more objects.

19. The non-transitory computer readable medium of claim 17, wherein the first set of objects are stored in the database tables and wherein the second set of objects are included in a virtual table of a view generated by executing said one or more commands which operate on data included in any of said first set of objects and said third set of objects.

20. The non-transitory computer readable medium of claim 19, wherein the database query generates a query result including data used to create the virtual table.

21. The non-transitory computer readable medium of claim 20, wherein the first set of objects is based on data collected upon the occurrence of a polling interval, the first set of objects including data storage configuration information describing a state of a data storage system, each of the association objects being represented using two primary keys of a database table to associate a pair of objects of the second set.

* * * * *